US012046074B2

United States Patent
Negi et al.

(10) Patent No.: US 12,046,074 B2
(45) Date of Patent: Jul. 23, 2024

(54) SYSTEMS AND METHODS FOR REAL-TIME USER VERIFICATION IN ONLINE EDUCATION

(71) Applicant: McAfee, LLC, San Jose, CA (US)

(72) Inventors: Ansuya Negi, Beaverton, OR (US); Igor Tatourian, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 221 days.

(21) Appl. No.: 17/164,501

(22) Filed: Feb. 1, 2021

(65) Prior Publication Data

US 2021/0158026 A1    May 27, 2021

Related U.S. Application Data

(63) Continuation of application No. 15/657,443, filed on Jul. 24, 2017, now Pat. No. 10,909,354, which is a
(Continued)

(51) Int. Cl.
*G06V 40/16* (2022.01)
*G06F 16/51* (2019.01)
(Continued)

(52) U.S. Cl.
CPC ............ *G06V 40/172* (2022.01); *G06F 16/51* (2019.01); *G06V 40/45* (2022.01); *G09B 5/00* (2013.01);
(Continued)

(58) Field of Classification Search
CPC ...... G06V 40/172; G06V 40/45; G06V 40/15; G06F 16/51; G06F 21/32; G09B 5/062; G09B 7/02; G09B 5/00; H04L 63/0861
See application file for complete search history.

(56) References Cited

U.S. PATENT DOCUMENTS 5,447,747 A * 9/1995 Munter ............... G11B 5/842
427/128
5,915,973 A * 6/1999 Hoehn-Saric ......... G07C 9/37
434/323
(Continued)

FOREIGN PATENT DOCUMENTS

CN  1685380    10/2005
CN  1757057 A   4/2006
(Continued)

OTHER PUBLICATIONS

European Patent Office, "Extended European Search Report," issued in connection with European Patent Application No. 15874030.8, on Dec. 13, 2018, 11 pages.
(Continued)

*Primary Examiner* — Samir A Ahmed
(74) *Attorney, Agent, or Firm* — HANLEY, FLIGHT & ZIMMERMAN, LLC

(57) ABSTRACT

Systems and methods for real-time user verification in online education are disclosed. In certain example embodiments, user identifying information associated with a user and a request to access online education content may be received from a user device. A face template including historical facial image data for the user can be identified. Current facial image data can be compared to the face template to determine if a match exists. Biometric sensor data, such as heart rate data, may also be received for the user. The biometric sensor data may be evaluated to determine if the user is currently located at the user device. If the user is currently located at the user device and the current facial image data matches the face template, access to the online education content may be provided to the user at the user device.

18 Claims, 8 Drawing Sheets

Related U.S. Application Data continuation of application No. 14/579,411, filed on Dec. 22, 2014, now Pat. No. 9,715,621.

(51) Int. Cl.
*G06V 40/40* (2022.01)
*G09B 5/00* (2006.01)
*G09B 5/06* (2006.01)
*G09B 7/02* (2006.01)
*H04L 9/40* (2022.01)
*G06V 40/10* (2022.01)

(52) U.S. Cl.
CPC .............. *G09B 5/062* (2013.01); *G09B 7/02* (2013.01); *H04L 63/0861* (2013.01); *G06V 40/15* (2022.01)

(56) References Cited

U.S. PATENT DOCUMENTS

| | | | |
|---|---|---|---|
| 6,263,439 | B1 | 7/2001 | Hondros et al. |
| 6,715,679 | B1 | 4/2004 | Infosino |
| 8,036,431 | B1* | 10/2011 | Fisher .................... G06V 40/13 |
| | | | 382/116 |
| 8,156,246 | B2 | 4/2012 | Short et al. |
| 8,326,211 | B1 | 12/2012 | Hillier et al. |
| 8,677,139 | B1 | 3/2014 | Kalocsai |
| 8,775,515 | B2* | 7/2014 | Lippert .................. G06Q 50/20 |
| | | | 434/323 |
| 8,985,443 | B1 | 3/2015 | Boyle |
| 9,214,090 | B2* | 12/2015 | Hillier ...................... G09B 5/00 |
| 9,715,621 | B2 | 7/2017 | Negi et al. |
| 10,909,354 | B2 | 2/2021 | Negi et al. |
| 2001/0042004 | A1 | 11/2001 | Taub |
| 2003/0074320 | A1* | 4/2003 | Riggs ...................... G06F 21/10 |
| | | | 705/51 |
| 2003/0134261 | A1* | 7/2003 | Jennen ...................... G09B 7/00 |
| | | | 434/354 |
| 2004/0161728 | A1* | 8/2004 | Benevento, II ........ G06Q 10/10 |
| | | | 434/118 |
| 2006/0057550 | A1 | 3/2006 | Sahashi |
| 2006/0135876 | A1 | 6/2006 | Andresen et al. |
| 2006/0136744 | A1 | 6/2006 | Lange |
| 2007/0032731 | A1 | 2/2007 | Lovejoy et al. |
| 2008/0272905 | A1 | 11/2008 | Higaki et al. |
| 2010/0121737 | A1 | 5/2010 | Yoshida |
| 2010/0214062 | A1 | 8/2010 | Hayashida |
| 2010/0302000 | A1 | 12/2010 | Szymkowiak et al. |
| 2011/0082791 | A1 | 4/2011 | Baghdasaryan et al. |
| 2011/0104654 | A1 | 5/2011 | Eom et al. |
| 2012/0054842 | A1 | 3/2012 | Urios Rodriguez et al. |
| 2013/0138967 | A1 | 5/2013 | Auld et al. |
| 2013/0158423 | A1 | 6/2013 | Kapoor |
| 2013/0204786 | A1 | 8/2013 | Mattes et al. |
| 2013/0278414 | A1 | 10/2013 | Sprigg et al. |
| 2013/0279744 | A1 | 10/2013 | Ingrassia, Jr. et al. |
| 2014/0051945 | A1 | 2/2014 | Sarasua et al. |
| 2014/0087352 | A1* | 3/2014 | Hillier ...................... G09B 5/08 |
| | | | 434/350 |
| 2014/0195815 | A1 | 7/2014 | Taveau et al. |
| 2014/0267741 | A1 | 9/2014 | King et al. |
| 2014/0337243 | A1 | 11/2014 | Dutt et al. |
| 2015/0161371 | A1 | 6/2015 | Hoshi et al. |
| 2016/0057623 | A1 | 2/2016 | Dutt et al. |
| 2016/0065558 | A1 | 3/2016 | Suresh et al. |
| 2016/0180150 | A1 | 6/2016 | Negi et al. |
| 2017/0323152 | A1 | 11/2017 | Negi et al. |

FOREIGN PATENT DOCUMENTS

| | | |
|---|---|---|
| CN | 102013176 | 4/2011 |
| CN | 102054372 | 5/2011 |
| CN | 103247197 | 8/2013 |
| JP | 2005258364 | 9/2005 |
| JP | 2006236260 A | 9/2006 |
| JP | 2008299640 A | 12/2008 |
| JP | 2009193477 A | 8/2009 |
| JP | 2009211340 | 9/2009 |
| JP | 2012203639 A | 10/2012 |
| JP | 2018511890 A | 4/2018 |
| KR | 20020009251 A | 2/2002 |
| KR | 10200200092515 | 12/2002 |
| KR | 20070050029 | 5/2007 |
| KR | 101328117 | 11/2013 |
| WO | 2004029905 A1 | 4/2004 |
| WO | 2014147713 | 9/2014 |
| WO | 2014194939 | 12/2014 |
| WO | 2016105827 A1 | 6/2016 |

OTHER PUBLICATIONS

Moini et al., "Leveraging Biometrics for User Authentication in Online Learning: A Systems Perspective," IEEE Systems Journal, vol. 3, No. 4, Dec. 1, 2009, pp. 469-476, 8 pages.

European Patent Office, "Supplementary European Search Report," issued in connection with European Patent Application No. 15874030.8, on Sep. 12, 2018, 15 pages.

Japanese Patent Office, "Notification of Reasons for Refusal," issued in connection with Japanese Patent Application No. 2017-551999, on Oct. 25, 2018, 7 pages.

International Bureau, "International Preliminary Report on Patentability," issued in connection with International Patent Application No. PCT/US2015/062602, on Jun. 27, 2017, 10 pages.

State Intellectual Property Office of China, "First Office Action," mailed in connection with Chinese Patent Application No. 201580076097.7, on Sep. 3, 2019, 17 pages.

National Intellectual Property Administration of China, "Notice of Decision of Granting Patent Right for Invention," mailed in connection with Chinese Patent Application No. 201580076097.7, on Mar. 3, 2020, 5 pages.

United States Patent and Trademark Office, "Notice of Allowance and Fee(s) Due", issued in connection with U.S. Appl. No. 14/579,411, mailed on Mar. 1, 2017, 5 pages.

United States Patent and Trademark Office, "Final Office Action", issued in connection with U.S. Appl. No. 14/579,411, mailed on Nov. 30, 2016, 17 pages.

United States Patent and Trademark Office, "Non-Final Office Action", issued in connection with U.S. Appl. No. 14/579,411, mailed on May 25, 2016, 14 pages.

International Searching Authority, "Search Report", issued in connection with PCT Patent Application No. PCT/US2015/062602, mailed on Mar. 28, 2016, 6 pages.

International Searching Authority, Written Opinion, issued in connection with PCT Patent Application No. PCT/US2015/062602, mailed on Mar. 28, 2016, 9 pages.

United States Patent and Trademark Office, "Non-Final Office Action", issued in connection with U.S. Appl. No. 15/657,443, mailed on Jan. 28, 2019, 16 pages.

United States Patent and Trademark Office, "Final Office Action", issued in connection with U.S. Appl. No. 15/657,443, mailed on Aug. 7, 2019, 16 pages.

United States Patent and Trademark Office, "Non-Final Office Action", issued in connection with U.S. Appl. No. 15/657,443, mailed on Dec. 20, 2019, 9 pages.

United States Patent and Trademark Office, "Final Office Action", issued in connection with U.S. Appl. No. 15/657,443, mailed on Jun. 2, 2020, 10 pages.

United States Patent and Trademark Office, "Notice of Allowance and Fee(s) Due", issued in connection with U.S. Appl. No. 15/657,443, mailed on Sep. 18, 2020, 7 pages.

Chinese Patent Office, "First Office action," issued in connection with CN Application No. 202010419801.7. dated Dec. 28, 2022, 10 pages.

Japanese Patent Office,"Notice of Reasons for Refusal", issued in connection with Japanese Patent Application No. 2017-551999, dated Oct. 30, 2018, 8 pages. [English Translation Provided.].

(56) References Cited

OTHER PUBLICATIONS

European Patent Office, "Supplementary Partial European Search Report," issued in connection with European Patent Application No. 15874030.8, dated Sep. 12, 2018, 5 pages.

European Patent Office, "Communication pursuant to Rule 164(1) EPC," issued in connection with European Patent Application No. 15874030.8, dated Sep. 12, 2018, 2 pages.

European Patent Office, "Communication pursuant to Rules 70(2) and 70a(2) EPC," issued in connection with European Patent Application No. 15874030.8, dated Jan. 8, 2019, 1 page.

Japanese Patent Office, "Decision of Refusal", issued in connection with Japanese Patent Application No. 2017-551999 dated May 28, 2019, 2 pages. [English Translation Provided.].

Chinese Patent Office, "Notice of Decision of Granting Parent Right," issued in connection with CN Application No. 202010419801.7. dated May 26, 2023, 4 pages.

Xin, "Design of "Video Avatar Virtual Classroom"for Distance Education Applications," Audio-Visual Education Research, China Academic Journal Electronic Publishing House, 1994-2010, 19 pages. [with machine-generated English translation].

\* cited by examiner

SYSTEMS AND METHODS FOR REAL-TIME USER VERIFICATION IN ONLINE EDUCATION

RELATED APPLICATION

This patent arises from a continuation of U.S. patent application Ser. No. 15/657,443, filed Jul. 24, 2017, entitled "Systems and Methods for Real-Time User Verification in Online Education," which is a continuation of U.S. patent application Ser. No. 14/579,411, filed Dec. 22, 2014, entitled "Systems and Methods for Real-Time User Verification in Online Education." U.S. patent application Ser. No. 15/657,443 and U.S. patent application Ser. No. 14/579,411 are hereby incorporated herein by reference in their entirety. Priority to U.S. patent application Ser. No. 15/657,443 and U.S. patent application Ser. No. 14/579,411 is hereby claimed.

TECHNICAL FIELD

This disclosure generally relates to online education and more specifically to systems and methods for real-time user verification in an online education environment.

BACKGROUND

The educational framework is changing. Over the last two decades, there has been a significant increase in online educational offerings, including from traditional educational institutions. Despite the increase in online educational offerings, problems still persist. One of the main issues that continue to prevent online education from having a similar stature as traditional brick-and-mortar schools is the potential for fraud. More specifically, current educational providers that provide online offerings have a difficult time verifying that the person taking an online course is who he/she says they are. This potential for fraud reduces the perceived stature and value of an online education as compared to a traditional "in-person" education.

BRIEF DESCRIPTION OF THE FIGURES

Reference will now be made to the accompanying drawings, which are not necessarily drawn to scale, and wherein.

DETAILED DESCRIPTION OF EXAMPLE EMBODIMENTS

Figure 1:
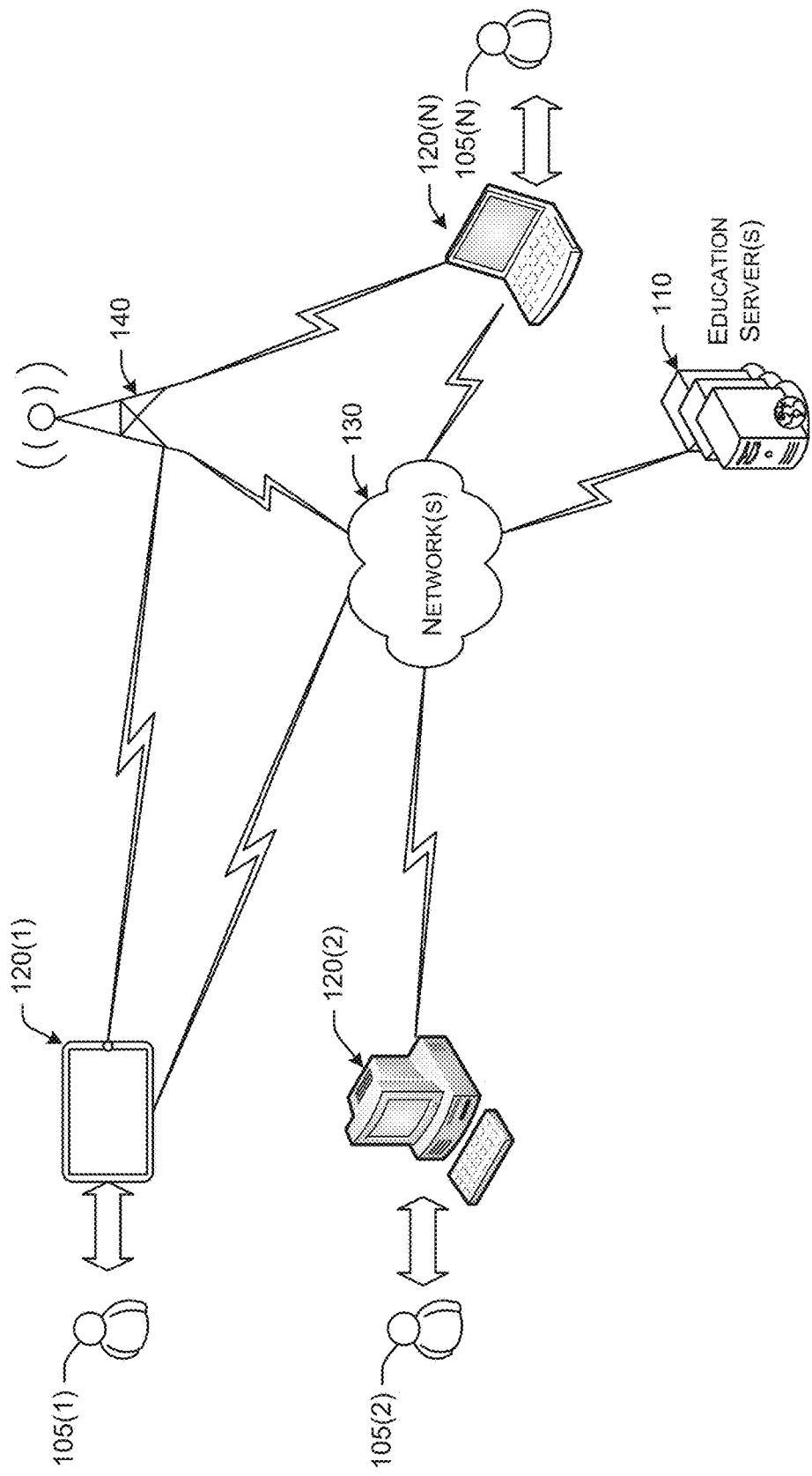
FIG. 1 is a simplified block diagram illustrating an example environment including online students and education servers providing real-time user verification in an online education environment, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Embodiments of the disclosure may provide systems and methods for real-time user verification based at least in part on images, biometric sensor information, and device identification information from a variety of sources. Examples of images that may be evaluated may include, but are not limited to, facial images of the user and images of the devices, such as the user device or biometric data device, in use by the user during an online education session. Examples of the biometric sensor information that may be received and evaluated during an online education session include, but are not limited to, heart rate, fingerprint identification, voice recognition, conductivity of the user's skin, chemical make-up of the user's sweat, thermal imaging of face veins, near-infrared or infrared imaging, and user hair follicles. This biometric sensor information may be collected by one or more biometric data devices. Examples of biometric data devices may include, but are not limited to ear buds, headphones, user-wearable biometric sensors, other forms of biometric sensors, or the like. In certain example embodiments, each biometric data device may further include a pattern along an exterior of the biometric data device. The pattern may be one that is detectable as by a camera associated with the user device and can be evaluated by a facial recognition module (discussed below) to determine if the pattern is an expected pattern associated with the particular biometric data device associated with the user.

While the example embodiments described below will be described with reference to the biometric sensor information being user heart rate data, any other biometric sensor and biometric sensor information known to one of ordinary skill in the art could be substituted for, and should each be individually read as being a part of these systems and method. As such, where the discussion of the systems and methods below and the drawings describe ear buds containing a heart rate monitor, any other type biometric sensor (including other forms of heart rate monitors) could be substituted and is included as part of this disclosure. The images, biometric sensor information, and/or device identification information may be stored and evaluated locally at a user device, and/or received and evaluated by one or more education servers from a user via their user device. These user devices may include a variety of personal devices such as communications devices that may include, for example, a personal computer, a laptop computer, a tablet computing device, netbook computers, smart phones, personal digital assistants, or the like.

The user devices may include or may be communicably coupled to a camera or other image sensor to capture images of the user and/or the patterns on the biometric data devices. In certain example embodiments, the camera may be embedded within the user device.

Alternatively, the camera may be a separate device that is communicably coupled to the user device. In certain example embodiments, the camera may provide standard or infrared imaging for evaluation. The images generated by the camera may be used to generate a face template for a user. The images generated by the camera may further be used to generate facial image data of the user that may be compared to the face template of the user to determine if the facial image data of the user matches the face template for the user. The images generated by the camera may further be used to identify one or more known patterns on the biometric data device. Providing known patterns on the biometric data device and using the camera to determine if the known patterns can be detected from the biometric data device, further acts as a spoof deterrent.

The image data, biometric sensor information, and device identification information associated with communications between a user device and communications infrastructure, such as a cellular telephone tower, may be received by the education server. This information may be received directly from the user device or, alternatively, from a communications server associated with the communications infrastructure. This information may be used to determine if the user associated with the login information at the user device is who he/she says they are and if the user continuing to be physically present at the user device while online education services are being provided to the user. For example, the user device and/or education server may receive image data, biometric sensor information and device identification information from the user device, the camera and/or the biometric data device. The user device and/or the education server can determine if the received device identification information is for a user device and/or biometric data device associated with the user, if the image received from the camera matches a face template for the user, if the image received from the camera includes a known pattern on the biometric data device and if the biometric sensor information indicates the user is actually at the user device. Based on one or more of these determinations, the education server can determine whether to provide the user access to the desired online education services and/or to generate notifications regarding the perceived authenticity of the user at the user device.

FIG. 1 is a simplified block diagram illustrating an example environment 100 including online users (e.g., students) and education servers providing real-time user verification in an online education environment 100, in accordance with example embodiments of the disclosure. The example online education environment 100 may include one or more user(s) 105(1), 105(2), 105(3), . . . , 105(N) (hereinafter collectively or individually referred to as user 105) using their respective user devices 120(1), 120(2), 120(3), . . . , 120(N) (hereinafter collectively or individually referred to as user device 120).

The user device 120 may be any one of suitable devices that may be configured to execute one or more applications, software, and/or instructions to provide one or more images, sensor signals, and/or communications signals. The user device 120, as used herein, may be any variety of client devices, electronic devices, communications devices, and/or mobile devices. The user device 120 may include, but is not limited to, a tablet computing device, an electronic book (ebook) reader, a netbook computer, a notebook computer, a laptop computer, a desktop computer, a web-enabled television, a video game console, a personal digital assistant (PDA), a smart phone, or the like. While the drawings and/or specification may portray the user device 120 in the likeness of a laptop computer, desktop computer, or tablet computer device, the disclosure is not limited to such. Indeed, the systems and methods described herein may apply to any electronic device 120 generating an image, sensor signal, and/or communication signal.

As depicted in FIG. 1, the example online educational environment 100 may include the user device 120 communicably coupled to the education servers 110 via a network 130. The user device 120 may further be communicably coupled to a communications infrastructure 140, such as a cellular communications tower/receiver. The education servers 110 are configured to receive one or more of images, biometric sensor information, and/or device identification information from the user devices 120 or to facilitate the evaluation of the one or more of images, biometric sensor information, and/or device identification information by the user devices 120. Based, at least in part, on the received images, biometric sensor information, and/or device identification information, the education servers 110 may be configured to perform facial recognition matching, pattern recognition matching, biometric data evaluation, and/or device matching.

The networks 130 may include any one or a combination of different types of suitable communications networks, such as cable networks, the Internet, wireless networks, cellular networks, and other private and/or public networks. Furthermore the networks 130 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements (e.g., set-top boxes, etc.), as well as in non-client/server arrangements (e.g., locally stored software applications, etc.).

The communications infrastructure 140 may be configured to communicate with other communications infrastructure and/or user devices 120 using any suitable communication formats and/or protocols including, but not limited to, Wi-Fi, direct Wi-Fi, Bluetooth, 3G mobile communication, 4G mobile communication, long-term evolution (LTE), WiMax, direct satellite communications, or any combinations thereof. The communications infrastructure 140 may communicate with other communications infrastructure to receive and then retransmit information, such as data packets. The communications infrastructure 140 may be configured to receive wireless communications signals from the user devices 120. These communications signals may be wireless signals that include images, biometric sensor information, and/or device identification information from the user device 120 carried thereon. These transmitted images, biometric sensor information, and/or device identification information may be data that is identified by the user device 120 and coded on to and carried by the wireless signal that is received at the communications infrastructure 140. The communications infrastructure 140 may further be configured to transmit communications signals to the user device 120, such as from the education server 110 via the network 130.

Figure 2B:
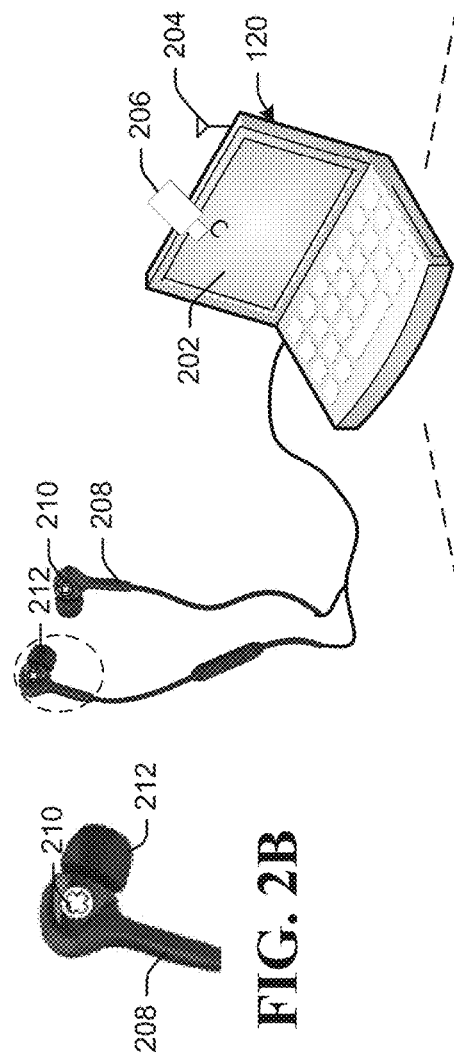
FIGS. 2A and 2B are simplified block diagrams illustrating an example architecture of user devices that provide user images and/or biometric user data for real-time user verification, in accordance with example embodiments of the disclosure.
Figure 2A:
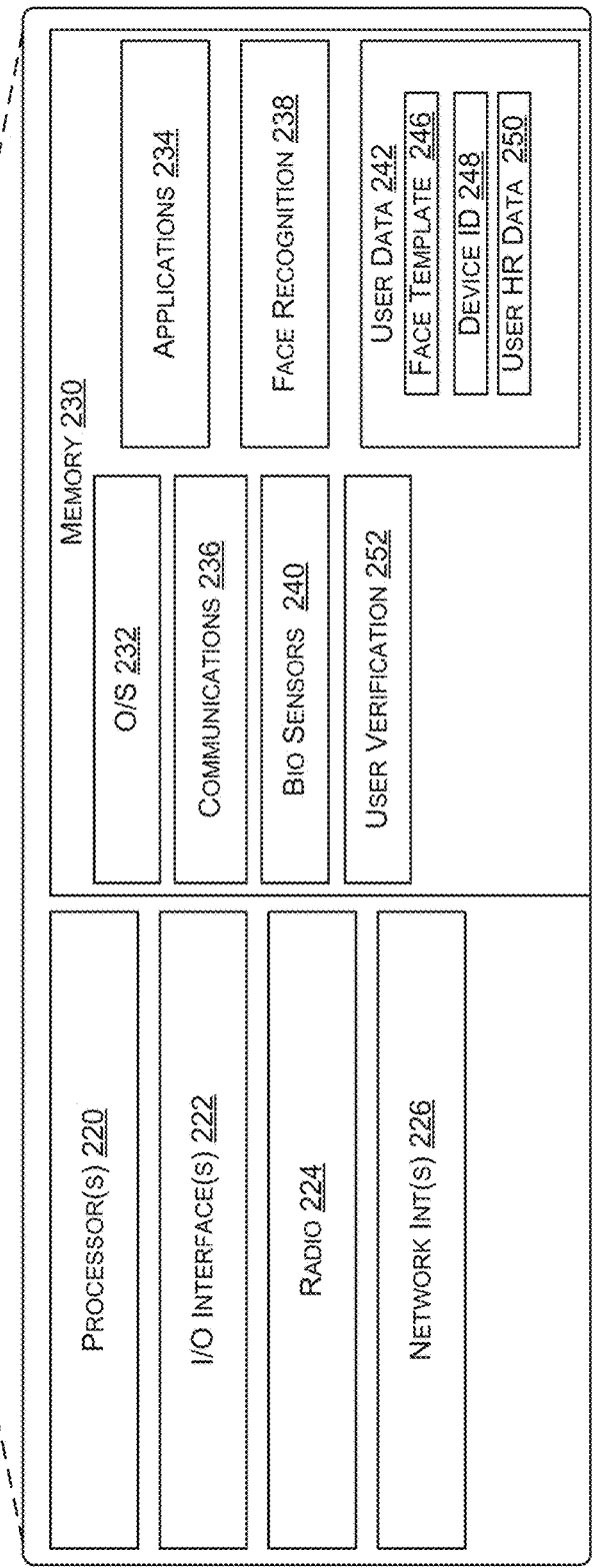

FIGS. 2A and 2B are simplified block diagrams illustrating an example architecture of a user device 120 that provides images, biometric sensor information, and/or device identification information for real-time user verification in an online education environment, in accordance with example embodiments of the disclosure. The user device 120 may include one or more user interfaces 202, an antenna 204 communicably coupled to the user device 120, and a camera 206 communicable coupled to the user device 120. In certain example embodiments, a biometric data device 208 may be communicably coupled to the user device 120. In one example embodiment, the biometric data device is ear buds or other types of headphones. Alternatively, other forms of biometric data device may be substituted. The ear buds 208 may include at least one known pattern 210 provided on an exterior surface of the ear buds 208. The known pattern may be 210 viewed and recognized by facial recognition modules discussed below.

The biometric data device may further include a heart rate monitor 212. In one example embodiment, the heart rate monitor 212 may be incorporated into an ear bud that is placed by the user 105 into the user's ear and receives and transmits heart rate data from the user 105. The user device 120 may include one or more processor(s) 220, input/output (I/O) interface(s) 222, a radio 224, network interface(s) 226, and memory 230.

The processors 220 of the user device 120 may be implemented as appropriate in hardware, software, firmware, or combinations thereof. Software or firmware implementations of the processors 220 may include computer-executable or machine-executable instructions written in any suitable programming language to perform the various functions described. Hardware implementations of the processors 220 may be configured to execute computer-executable or machine-executable instructions to perform the various functions described. In example embodiments, the processors 220 may be configured to execute instructions, software, and/or applications stored in the memory 220. The one or more processors 220 may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof. The user device 120 may also include a chipset (not shown) for controlling communications between one or more processors 220 and one or more of the other components of the user device 120. The processors 220 may also include one or more application specific integrated circuits (ASICs) a System-on-a-Chip (SoC), or application specific standard products (ASSPs) for handling specific data processing functions or tasks. In certain embodiments, the user device 120 may be based on an Intel® Architecture system and the one or more processors 220 and chipsets may be from a family of Intel® processors and chipsets, such as the Intel® Atom® processor family.

The one or more I/O device interfaces 222 may enable the use of one or more (I/O) device(s) or user interface(s) 202, such as a touch sensitive screen, keyboard, and/or mouse. The user 105 may be able to administer images, biometric sensor information, and/or device identification information from the user device 120 by interacting with the user interfaces 202 via the I/O device interfaces 222. The network interfaces(s) 226 may allow the user devices 120 to communicate via the one or more network(s) 130 and/or via other suitable communicative channels. For example, the user device 120 may be configured to communicate with stored databases, other computing devices or servers, user terminals, or other devices on the networks 130.

The radio 224 may include any suitable radio for transmitting and/or receiving radio frequency (RF) signals in the bandwidth and/or channels corresponding to the communications protocols utilized by the user device 120 to communicate with other user devices 120 and/or the communications infrastructure 140. The radio component 224 may include hardware and/or software to modulate communications signals according to pre-established transmission protocols. The radio component 224 may be configured to generate communications signals for one or more communications protocols including, but not limited to, Wi-Fi, direct Wi-Fi, Bluetooth, 3G mobile communication, 4G mobile communication, long-term evolution (LTE), WiMax, direct satellite communications, or combinations thereof. In alternative embodiments, protocols may be used for communications between relatively adjacent user device 120 and/or biometric data device 208, such as Bluetooth, dedicated short-range communication (DSRC), or other packetized radio communications. The radio component 224 may include any known receiver and baseband suitable for communicating via the communications protocols of the user device 120. The radio component 224 may further include a low noise amplifier (LNA), additional signal amplifiers, an analog-to-digital (A/D) converter, one or more buffers, and digital baseband. In certain embodiments, the communications signals generated by the radio 224 may be transmitted via the antenna 204 on the user device 120.

The memory 230 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 230 may store program instructions that are loadable and executable on the processor(s) 220, as well as data generated or received during the execution of these programs. The memory 230 may have stored thereon software modules including an operating system (O/S) module 232, applications module 234, communications module 236, face recognition module 238, bio sensors module 240, user data files 242, an user verification module 252. Each of the modules, files, and/or software stored on the memory 230 may provide functionality for the user device 120, when executed by the processors 220.

The 0/S module 232 may have one or more operating systems stored thereon. The processors 220 may be configured to access and execute one or more operating systems stored in the (0/S) module 232 to operate the system functions of the user device 120. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 234 may contain instructions and/or applications thereon that may be executed by the processors 220 to provide one or more functionality associated with the user device 120. These instructions and/or applications may, in certain aspects, interact with the (0/S) module 232 and/or other modules of the user device 120. The applications module 234 may have instructions, software, and/or code stored thereon that may be launched and/or executed by the processors 220 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The communications module 236 may have instructions stored thereon that, when executed by the processors 220, enable the user device 120 to provide a variety of communications functionality. In one aspect, the processors 220, by executing instructions stored in the communications module 236, may be configured to demodulate and/or decode communications signals received by the user device 120 via the antenna 204 and radio 224. The received communications signals may further carry audio, beacons data, handshaking, information, and/or other data thereon. In another aspect, the processors 220, by executing instructions from at least the communications module 236, may be configured to generate and transmit communications signals via the radio 224 and/or the antenna 204. The processors 220 may encode and/or modulate communications signals to be transmitted by the user device 120.

The face recognition module 238 may have instructions stored thereon that, when executed by the processors 220 enable the user device 120 to employ one or more facial recognition algorithms to compare one image generated by a camera 206 to another image generated by the camera 206 to determine if the images match or substantially match. For example, the face recognition module 238 may include instructions for comparing current facial images of the user 105 to a historical face template for the user 105 to determine if they match or substantially match. In addition, the face recognition module 238 may have instructions for determining the location of the biometric data device(s) 208 in the current facial images of the user 105, focusing in on the location of the biometric data device(s) 208, and determining if the biometric data device(s) 208 includes a known pattern 210 on the exterior of the biometric data device(s) 208.

The bio sensor module 240 may have instructions stored thereon that, when executed by the processors 220 enable the user device 120 to receive and evaluate biometric sensor data from a biometric data device 208, such as the ear buds 208 of FIG. 2. In certain example embodiments, the bio sensor module 240 may store and access, from the user data files 242, historical biometric sensor data for the user 105. The bio sensor module 240 may also receive biometric sensor data from the biometric data device 208, and can determine if the biometric sensor data is indicative of a live person at the user device 120. Further, the bio sensor module 240 may compare the current biometric sensor data to historical biometric sensor data for the user 105 to determine if the data likely came from the same user 105. For example, the bio sensor module 240 may compare the current heart rate data from the user 105 to stored historical heart rate data for the user 105 to determine if there is a match or substantial match.

The user verification module 252 may have instructions stored thereon that, when executed by the processors 220 enable the user device 120 to conduct user authorization and evaluation in an online education environment. The user verification module 252 may evaluate the likelihood the user 105 is who they purport to be and, based on that evaluation, may allow or deny access to the online education environment. Further, the user verification module 252 when executed by the processors 220, can periodically supplement its verification review by conducting additional verification reviews of the user 105. The verification reviews may include device verification, facial recognition, biometric data evaluations and comparisons, and evaluation of user scores in online class environments.

The user data files 242 may include information associated with one or more users 105 (e.g., in situations where multiple users 105 of the user device 120 are accessing the online education environment) having access to the online education environment 100. The user data files 242 may include user identification information (e.g., user name, address, phone number, email address, login and password information) for the user 105. The user data files 242 may also include face template files 246, device ID files 248, and user heart rate data files 250. The face template files 246 may include a face template for the user 105 that may be used by the face recognition module 238 to compare to current facial image data for the user 105 and to verify the user 105 is authentic. The device ID files 248 may include the device identification data for the user device 120 and/or for any device associated with the user 105 in the online education environment. The user heart rate data files 250 may store historical heart rate data for the user 105. The historical heart rate data may be retrieved and compared by the bio-sensors module 240 to determine if the historical heart rate data matches or substantially matches the current heart rate data received from the biometric data device 208.

It will be appreciated that there may be overlap in the functionality of the instructions stored in the operating system (O/S) module 232, the applications module 234, the communications module 236, the face recognition module 238, the bio sensors module 240, and the user verification module 252. In fact, the functions of the aforementioned modules 232, 234, 236, 238, 240, and 252 may interact and cooperate seamlessly under the framework of the education servers 110. Indeed, each of the functions described for any of the modules 232, 234, 236, 238, 240, and 252 may be stored in any module 232, 234, 236, 238, 240, and 252 in accordance with certain embodiments of the disclosure. Further, in certain example embodiments, there may be one single module that includes the instructions, programs, and/or applications described within the operating system (O/S) module 232, the applications module 234, the communications module 236, the face recognition module 238, the bio sensors module 240, and the user verification module 252.

Figure 3:
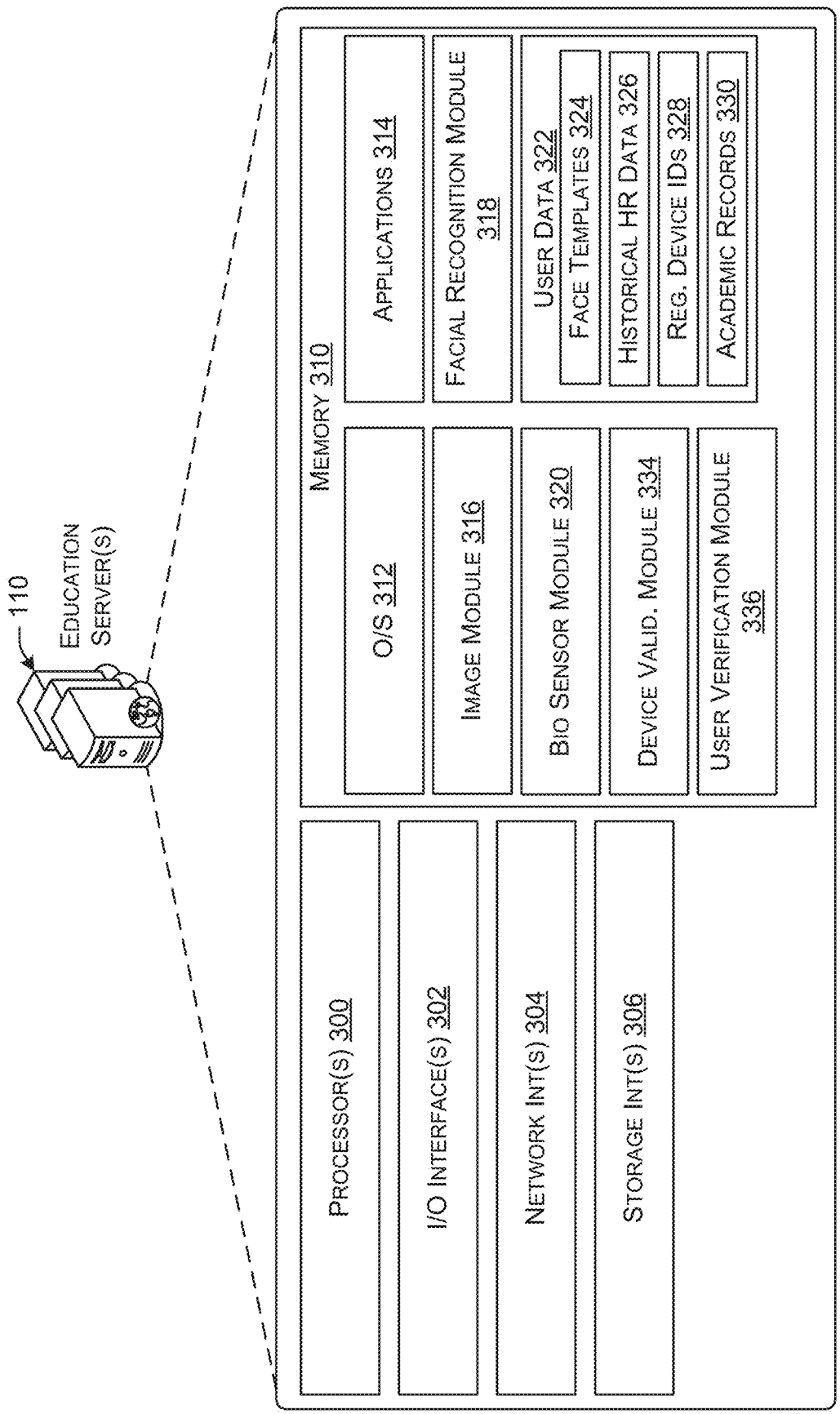
FIG. 3 is a simplified block diagram illustrating an example architecture of an online education server, in accordance with example embodiments of the disclosure.

FIG. 3 is a simplified block diagram illustrating an example architecture of the education server 110, in accordance with example embodiments of the disclosure. The education server 110 may include one of more processors 300, I/O interface(s) 302, network interface(s) 304, storage interface(s) 306, and memory 310.

In some examples, the processors 300 of the education servers 110 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof. The education servers 110 may also include a chipset (not shown) for controlling communications between the one or more processors 300 and one or more of the other components of the education servers 110. The one or more processors 300 may also include one or more application specific integrated circuits (ASICs), a System-on-a-Chip (SoC), or application specific standard products (ASSPs) for handling specific data processing functions or tasks. In certain embodiments, the education servers 110 may be based on an Intel® Architecture system and the one or more processors 300 and chipset may be from a family of Intel® processors and chipsets, such as the Intel® Atom® processor family.

The one or more I/O device interfaces 302 may enable the use of one or more (I/O) device(s) or user interface(s), such as a keyboard and/or mouse. The network interfaces(s) 302 may allow the education servers 110 to communicate via the one or more network(s) 130 and/or via other suitable communicative channels. For example, the education servers 110 may be configured to communicate with stored databases, other computing devices or servers, user terminals, or other devices on the networks 130. The storage interface(s) 306 may enable the education servers 110 to store information, such as images (e.g., face templates), biometric sensor data (e.g., heart rate data), user data (e.g., student information, logins, and passwords), academic records for a multitude of users 105 of the online education environment 100, and/or user device and biometric data device identification information in storage devices.

The memory 310 may include one or more volatile and/or non-volatile memory devices including, but not limited to, magnetic storage devices, read-only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read-only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, an image module 316, a facial recognition module 318, a bio sensor module 320, a device validation module 334, a user verification module 336, and/or user data 322. Each of the modules, data, and/or software may provide functionality for the education servers 110, when executed by the processors 300. The modules, data, and/or the software may or may not correspond to physical locations and/or addresses in memory 310. In other words, the contents of each of the modules 312, 314, 316, 318, 320, 334, and 336 may not be segregated from each other and may, in fact be stored in at least partially interleaved positions on the memory 310. Further, while the example embodiment in FIG. 3 presents the modules 312, 314, 316, 318, 320, 334, and 336 as being separate, in other example embodiments the operations of these modules may be combined in any manner into fewer than the seven modules presented. For example, the operations of the image module 316 and the facial recognition module 318 may be combined. In another example, all of the operations of these modules 312, 314, 316, 318, 320, 334, and 336 may be completed by a single module. Any other combination and consolidation of operations of the modules 312, 314, 316, 318, 320, 334, and 336 is contemplated herein.

The 0/S module 312 may have one or more operating systems stored thereon. The processors 300 may be configured to access and execute one or more operating systems stored in the (0/S) module 312 to operate the system functions of the education server 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more functionality associated with provided online education services to a multitude of users 105 (e.g., students). These instructions and/or applications may, in certain aspects, interact with the (O/S) module 312 and/or other modules of the education servers 110. The applications module 314 may have instructions, software, and/or code stored thereon that may be launched and/or executed by the processors 300 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The image module 316 may have instructions stored thereon that, when executed by the processors 300, enable the education servers 110 to provide a variety of imaging management and/or image processing related functionality. In one aspect, the processors 300 may be configured to receive one or more images from one or more user devices 120 via the networks 130 or other suitable communicative links. These images may be stored on the memory 310 and/or other suitable database(s). The images may further be analyzed by the processors 300 by executing instructions stored in the facial recognition module 318 and/or the bio sensor module 320.

The facial recognition module 318 may have instructions stored thereon that, when executed by the processors 300 enable the education servicer 110 to employ one or more facial recognition algorithms to compare one image generated by a camera 206 at a user device 120 to another image generated by the camera 206 to determine if the images match or substantially match. The comparison may involve a variety of suitable algorithms and, in certain example embodiments, may result in a probability of a match of the feature in the first cluster of pixels in the first image and the second cluster of pixels in the second image. In some cases, if the probability of a match is greater than a predetermined threshold level, it may be determined that the feature in the two images may be a match. In some cases, feature matching algorithms of this type, performed by the processors 500, may include determining a correlation and/or a cross correlation of a variety of parameters associated with the images, or portions thereof, such as the cluster of pixels that may be compared in the first image and the second image. Example parameters that may be compared across images may include pixel color(s), intensity, brightness, or the like. It will be appreciated that while the localization system and mechanism is described with reference to two images, the systems and the algorithms may be extended to any number of received images that are to be compared and localized. It will further be appreciated that the processors 500 may perform a variety of mathematical and/or statistical algorithms to identify and/or "recognize" features that appear across more than one image. The mathematical and/or statistical algorithms may involve a variety of suitable techniques, such as iterative comparisons of image pixels, or portions thereof, and/or a variety of filtering techniques to isolate particular pixels of an image, such as threshold filtering.

For example, the facial recognition module 318 may include instructions for comparing current facial images of the user 105 to a historical face template for the user 105 to determine if they match or substantially match. In addition, the facial recognition module 318 may have instructions for determining the location of the biometric data device(s) 208 in the current facial images of the user 105. The facial recognition module 318 may focus in on the location of the biometric data device(s) 208 and determine if the biometric data device(s) 208 includes a known pattern 210 on the exterior of the biometric data device(s) 208.

The bio sensor module 320 may have instructions stored thereon that, when executed by the processors 300 enable the education server 110 to receive and evaluate biometric sensor data from a biometric data device 208, such as the ear buds 208 of FIG. 2. In certain example embodiments, the bio sensor module 320 may store and access, from the user data files 322 or the user data files 242 of a user device 120, historical biometric sensor data for the user 105. The bio sensor module 320 may also receive biometric sensor data from the biometric data device 208, and can determine if the biometric sensor data is indicative of a live person at the user device 120. Further, the bio sensor module 320 may compare the current biometric sensor data to historical biometric sensor data for the user 105 to determine if the data likely came from the same user 105. For example, the bio sensor module 320 may compare the current heart rate data from the user 105 to stored historical heart rate data for the user 105 to determine if there is a match or substantial match.

The device validation module 334 may have instructions stored thereon that, when executed by the processors 300, enable the education server 110 to receive device identification information from a user device 120, retrieve stored device identification information associated with the user 105 from a registered device IDs file 328, and compare the stored device identification information to the received device identification information to determine if a match exists. The device validation module 334 is capable of determining those devices, including user devices 120 and biometric data devices 208 that are associated with a particular user 105. The device validation module 334 is also capable of obtaining new device identification information for a new device and associated the device identification information with the user data in the registered device IDs file 328. In addition, the device validation module 334 may be capable of identifying a device (such as a user device 120 or biometric data device 208) that is shared between multiple users 105 so that the user verification module 336 in conjunction with the facial recognition module 318 and/or the bio sensor module 320 may determine the particular user 105 currently using the device.

The user verification module 336 may have instructions stored thereon that, when executed by the processors 300 enable the education server 120 to conduct user authorization and evaluation in an online education environment. The user verification module 336 may evaluate the likelihood the user 105 is who they purport to be and, based on that evaluation, may allow or deny access to the online education environment. Further, the user verification module 336 when executed by the processors 300, can periodically supplement its verification of the user 105 by conducting additional verification reviews of the user 105. The verification reviews may include device verification, facial recognition, biometric data evaluations and comparisons, and evaluation of user scores in online class environments.

The user data files 322 may include information associated with one or more users (e.g., students who have access to the online education environment provided by the education server 110. The user data files 322 may include user identification information (e.g., user name, address, phone number, email address, login and password information) for each user 105 having access to the online education environment. The user data files 322 may also include face template files 324, historical heart rate data files 326, registered device ID files 328, and academic records files 330. The face templates files 324 may include a face template for each user 105 (e.g., student) having access to the online education environment. Alternatively, the face templates files 324 may not include the actual face templates for users 105 but may instead include tokens representing stored face templates for users stored on their respective user devices 120. The face templates may be used by the facial recognition module 318 to compare to current facial image data for the user 105 and to verify the user is authentic. The historical heart rate data files 326 may include historical heart rate data for users 105 having access to the online education environment Alternatively, the historical heart rate data files 326 may not include the actual historical heart rate or other biometric data for users 105 but may instead include tokens representing historical heart rate data or other biometric data for users 105 stored on their respective user devices 120. The historical heart rate data may be retrieved and compared by the bio sensor module 320 to determine if the historical heart rate data matches or substantially matches the current heart rate data received from the biometric data device 208.

The device ID files 248 may include the device identification data for each device (e.g., user device and biometric data device) associated with the user 105 in the online education environment. The user verification module 336 may employ the device validation module 334 to compare a received device identification data to the device identification data associated with the user 105 and stored in the registered device IDs file 328 to determine if a match exists and the device currently in use by the user 105 is a device the user 105 is expected to use.

The academic records file 330 may include the academic records for each user and former user having access to the online education environment (e.g., each current and former student of the school). In one example embodiment, the data in the academic records file 330 may include user identification information, quizzes and test scores, classes previously and current being taken by a user, user grades, modules or class sessions in which the user 105 participated, review questions attempted by the user 105, labs attended by the user 105, study sessions and discussion groups attended by the user 105 and the content discussed, and the like.

It will be appreciated that there may be overlap in the functionality of the instructions stored in the operating systems (O/S) module 312, the applications module 314, the image module 316, the facial recognition module 318, the bio sensor module 320, the device validation module 334 and/or the user verification module 336. In fact, the functions of the aforementioned modules 312, 314, 316, 318, 320, 334, and 336 may interact and cooperate seamlessly under the framework of the education servers 110. Indeed, each of the functions described for any of the modules 312, 314, 316, 318, 320, 334, and 336 may be stored in any module 312, 314, 316, 318, 320, 334, and 336 in accordance with certain example embodiments of the disclosure. Further, in certain embodiments, there may be one single module that includes the instructions, programs, and/or applications described within the operating systems (O/S) module 312, the applications module 314, the image module 316, the facial recognition module 318, the bio sensor module 320, the device validation module 334 and/or the user verification module 336.

Figure 4:
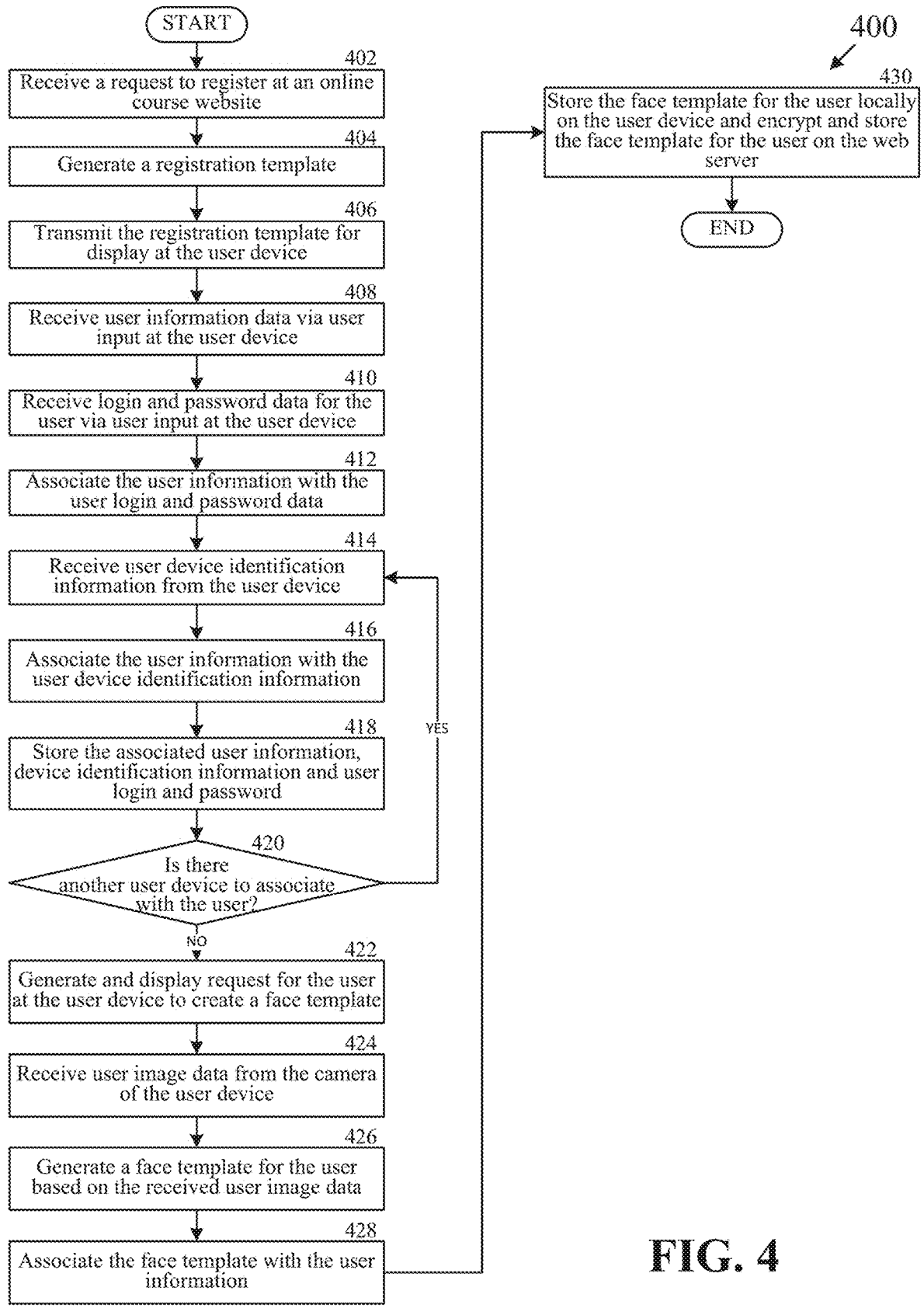
FIG. 4 is a flow chart illustrating an example method for receiving and storing user-specific image and/or biometric data for use in real-time user verification, in accordance with example embodiments of the disclosure.

FIG. 4 is a flow chart illustrating an example method 400 for receiving and storing user-specific image, device, and biometric data for use in real-time user verification, in accordance with certain example embodiments of the disclosure. This method 400 may be performed by the education servers 110 and the processors 300 thereon. Now referring to FIGS. 1-4, the exemplary method 400 begins at the START block and proceeds to block 402, where the education server 110 receives a request to register or update user information at a website for an online course provider. For example, a user 110, via a user device 120, may access the online course website associated with the education server 110 via the network 130 to request an opportunity to register or otherwise provide user verification information.

At block 404, the processor 300 may generate or otherwise retrieve from memory 310 a registration template for providing user verification information. At block 406, the processor 300 of the education server 110 may transmit via the network interface 226 by way of the network 130 for display or otherwise provide access to the registration template by the user device 120. At block 408, the education server 110 may receive user information data via user input at the user device 120. For example, the user information data may include, but is not limited to, the user's name, address, contact information, social security number, school identification number or any other information that uniquely identifies the user 110. The processor 300 may facilitate the receipt of the user information data, which can then be stored in memory 310. For example, the user information data can be stored in the user data 322.

At block 410, the education server 110, via the online course website, may receive login and password data for the user by way of user input at the user device 120. For example, via the online course website, the processor 300 may receive the login and password data. The processor 300 may direct a user setup application 314 to associate the user information with the user login information and password data at block 412. For example, the application 314 may store in user data 322, the associated user login and password information with the user information data.

At block 414, the education server 110 can receive user device identification information (e.g., a device ID) from one or more user devices 120 via the network 130. For example, the user device identification information can be one or more pieces of information that uniquely identify the user device 120 from other user devices. Examples of types of information that may be used to make up the user device identification information include, but are not limited to, device password, operating system name, operating system version, and operating system manufacturer. Those of ordinary skill in the art will recognize that other forms of device fingerprinting may be substitute herein as part of the provision of user device information to the education server 110. At block 416, the processor 300 may direct a user setup application 314 to associate the user information with the device identification information. For example, at block 418, the application 314 may store the device identification data with the user information data in the user data file 322 of memory 310. Alternatively, the device identification data may be stored on the user device 120. In this alternative embodiment, the processor 220 may direct a user setup application 234, for example, to store the device identification data in the device ID file 248 of memory 230. A token associated with the device identification data may then be received by the education server 110 via the network 130, associated with the user information, and stored in the registered device IDs file 328 of memory 310.

At block 420, an inquiry is conducted to determine if there is another device to associate with the user information. Examples of other devices include other user devices 120 (such as a different personal computer, laptop computer, tablet, netbook, etc.) and biometric data devices (e.g., ear buds 208, another heart rate monitor, other biometric data devices and sensors, a camera, etc.). In one example, the determination may be made by the processor 300 based on devices attached to the user device 120 or via user input at the user device 120 in response to a request from the online course website. If additional device information data for another device needs to be associated with the user, the YES branch is followed to block 414. Otherwise, the NO branch is followed to block 422.

At block 422, a request for the user 105 to create a face template is generated for display on the user device 120. In one example, the processor 300, via user verification module 336, can generate or access a stored copy of the request from memory 310 and the network interface 304 can transmit the request via the network 130 to the user device 120. At block 424, image data for the user can be received from the camera 206 of the user device 120. At block 426, a face template can be generated for the user based on the received user image data. In example embodiments where the face template data will not be stored at the education server 110, the processor 220 may employ the user verification module 252 at the user device to generate the face template data. In example embodiments, where the face template data will be stored at the education server 110, the processor 300, via the user verification module 252 may receive the user image data and generate the face template for the user 105.

At block 428, the processor 220 or 300 may employ the user verification module 252 and 336, respectively, to associate the face template data for the user with the user information. At block 430, the face template for the user 105 may be stored locally in the face template file 246 on the user device 120, and encrypted and stored as a token in the face templates file 324 of the education server 110. The process may then continue to the END block.

Figure 5A:
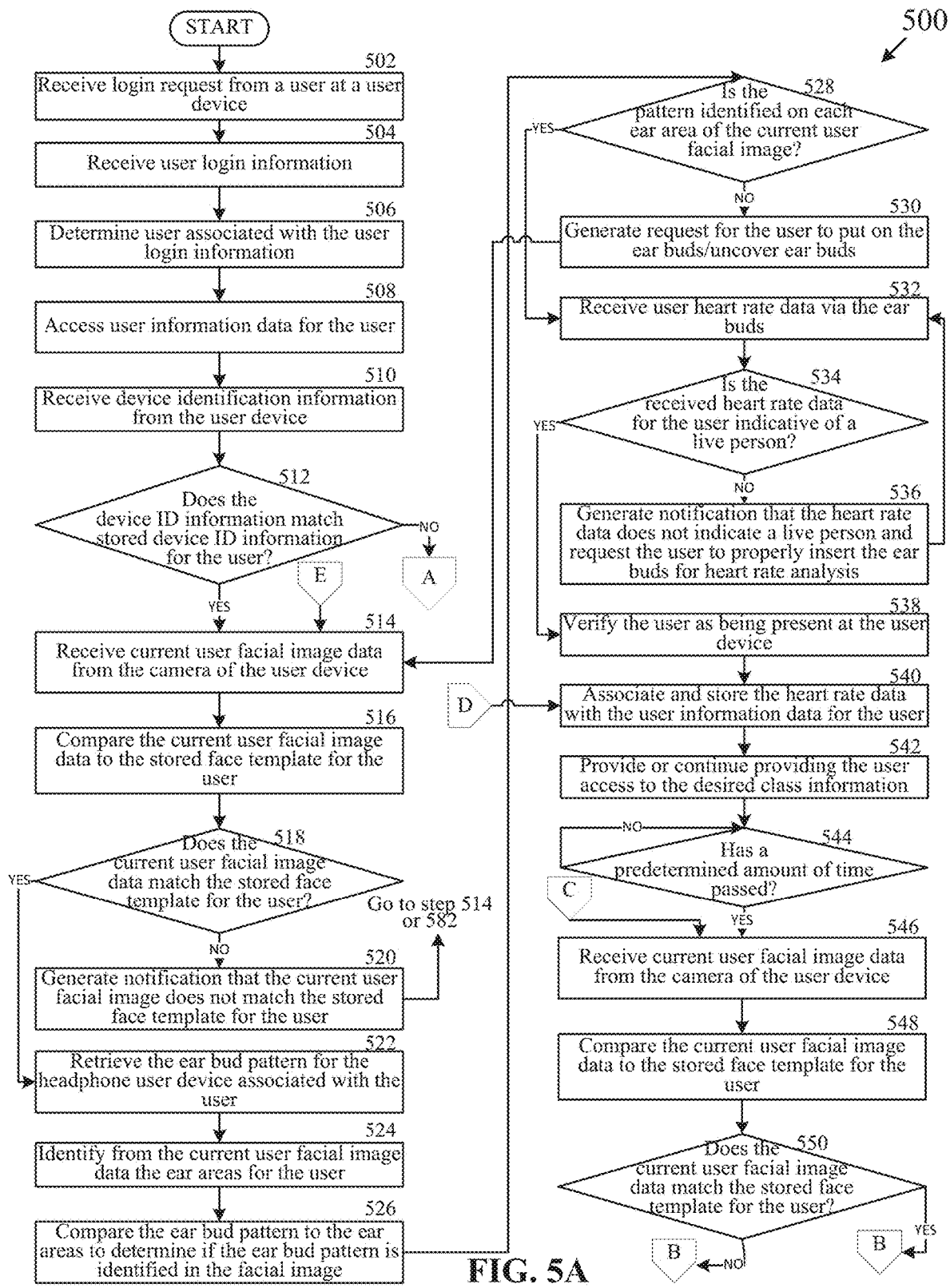
FIGS. 5A and 5B are a flow chart illustrating an example method for continuous user verification in an online education environment, in accordance with example embodiments of the disclosure.
Figure 5B:
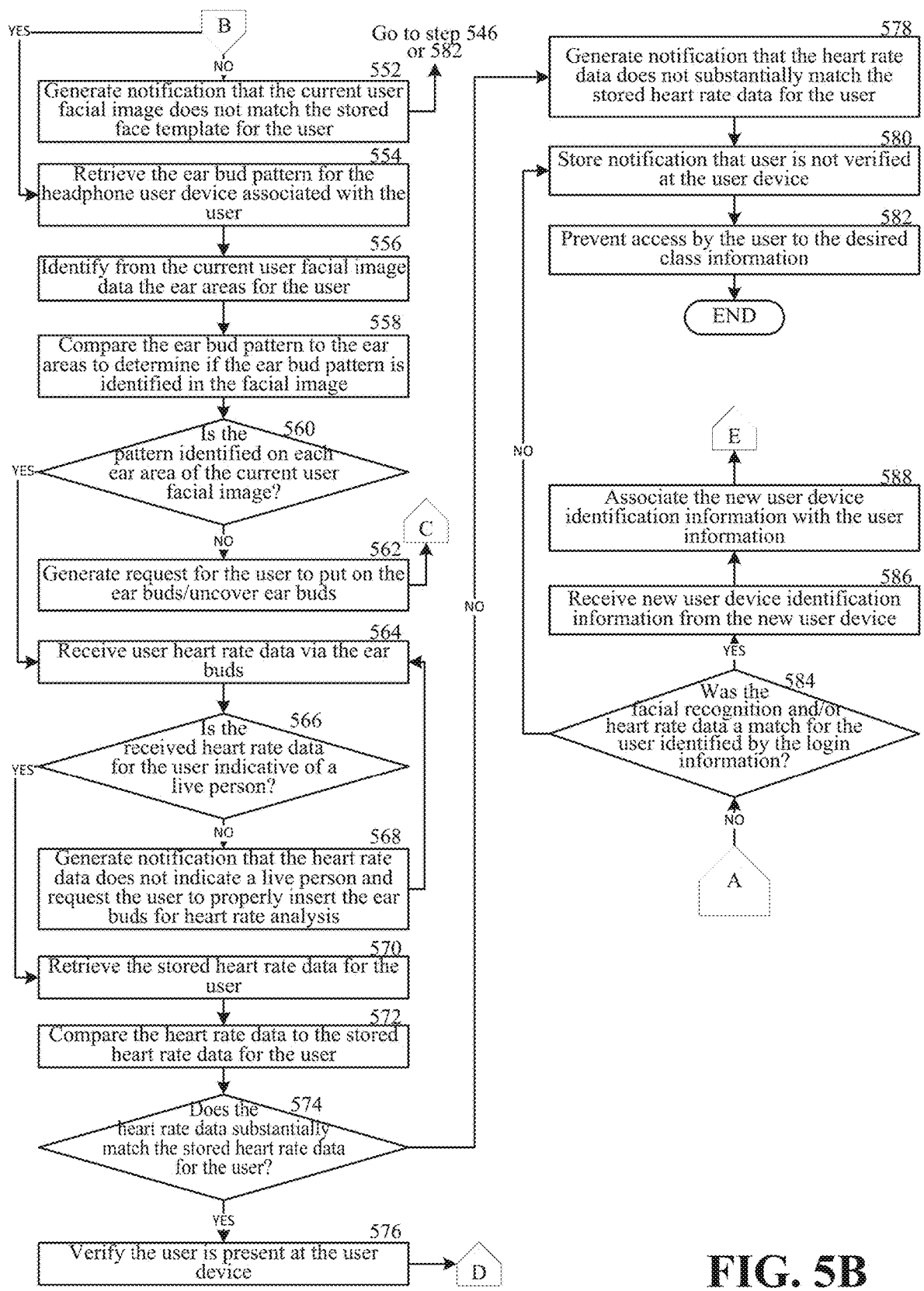

FIGS. 5A and 5B are a flow chart illustrating an example method 500 for continuous real-time user verification in an online education environment, in accordance with certain example embodiments of the disclosure. This method 500 may be performed by the education servers 110 and the processors 300 thereon. Now referring to FIGS. 1-3 and 5A-B, the exemplary method 500 begins at the START block and proceeds to block 502, where the education server 110 receives a login request from a user 105 at a user device 120. For example, a user 105, via a user device 120, may access the online course website associated with the education server 110 via the network 130 to make a login request in order to access online course information (e.g., an online class, quiz, lab, practice questions, help session, test, etc.). At block 504, login information for the user 105 is received. For example, the user 105 may input from the user device 120, the login information (e.g., login name and password) in a desired location of the online course website. The login information may be received by the education server 110 via the network 130. At block 506, the processor 300 of the education server 110 employs the user verification module 336 to determine the user associated with the login information. For example, the user verification module 336 can compare the login information with login information of multiple users stored in the user data file 322 to determine if a match exists and to determine the user based on the matching login information.

At block 508, the processor 300 employs the user verification module 336 to access user information data for the matching user 105. For example, the user information data may include the actual device identification information associated with the user 105, the face template for the user 105, and the biometric data for the user 105. Alternatively, the user information data may include one or more tokens associated with the device identification information, face template, and biometric data for the user 105 and the actual data may be stored on the user device 120.

At block 510, the education server 110 receives device identification information from the user device 120 via the network 130. In one example, the device identification information can be a device ID. In certain example embodiments, the user login information (e.g., login name and password) may not be received as it may not be deemed necessary, and identifying the user, face template for the user, and/or historical biometric data for the user may be based on an evaluation of the device identification information rather than the user login information. As such, reference to user identifying information may include one or more of the device identification information, the user login information, or any other information that uniquely identifies the user 105. At block 512, an inquiry is conducted to determine if the device identification information matches the stored device identification information for the user. The processor 300 of the education server 110 can employ the user verification module 336 to compare the received device identification information to the stored device identification information for the user 105 to determine if a match exists. In alternative embodiments where the evaluation takes place at the user device 120, the processor 220 of the user device 120 can employ the user verification module 252 to compare the current device identification information for the user device 120 to the stored device identification information for the user 105 to determine if a match exists. In example embodiments where there are multiple devices, such as a laptop computer 120 and ear buds 208, device identification information may be received for each and an evaluation may be made for each to determine if a match exists. If the device identification information does not match the stored device identification information for the user, the NO branch is followed to block 584 of FIG. 5B. In certain situations, the user 105 may change devices without going through the process of registering the new user device 120 or accessory device (e.g., biometric data device 208). For example, if the biometric data device (e.g., ear buds 208) no longer works, the user 105 may purchase new ear buds 208. Similarly, the user 105 may change the type of user device 120 (e.g., desktop computer, laptop computer, tablet, netbook computer, a web-enabled television, a video game console, a personal digital assistant (PDA), a smart phone, or the like, etc.) they are using. It may be beneficial (from a client services standpoint) to not require the user 105 to go back through the device registration process as described in FIG. 4 if the identity of the user can otherwise be verified. In block 584, an inquiry is conducted to determine if the facial recognition and/or heart rate data match the user identified by the login information. In one example embodiment, the determination may be made by the user verification module 336 and the determination regarding facial recognition matching and heart rate data matching can be completed as described in other portions of FIGS. 5A-B. If the facial recognition and/or heart rate data did not match for the user identified by the login information, the NO branch is followed to block 580. Otherwise, the YES block is followed to block 586.

In block 586, new user device identification information for the new user device/biometric data device may be received from the new user device/biometric data device as described in FIG. 4. In block 588, the new user device identification information may be associated with the user information for the user and stored in a manner substantially the same as that described in FIG. 4. The process may then continue to block 514 of FIG. 5A.

Returning to the inquiry of block 512, if the device identification information does match the stored device information, then the YES branch can be followed to block 514. At block 514, current user facial image data is received from the camera 206 of the user device 120. In one example embodiment, the current user facial image data is received by the user verification module 252 of the user device 120. However, in situations where the facial recognition evaluation will take place at the education server 110, the processor 300 may employ the user verification module 336 to receive the current user facial image data from the user device 120 via the network 130.

At block 516, the current user facial image data is compared to the stored face template for the user 105. In example embodiments where the comparison occurs at the user device 120, the processor 220 may employ the user verification module 252 to receive the face template for the user from the face template file 246 and can employ the face recognition module 238 to determine if the current user facial image data is sufficiently close to the face template to be considered a match. In example embodiments where the comparison occurs at the education server 110, the processor 300 may employ the user verification module 336 to receive the face template for the user from the face templates file 324 and can employ the facial recognition module 318 to compare and determine if the current user facial image data is sufficiently close to the face template for the user to be considered a match. Those of ordinary skill in the art will recognize that facial recognition software and algorithms for matching are well known, and, as such, a detailed description of how a match is determined is not necessary.

At block 518, an inquiry is conducted to determine if the current user facial image data matches the stored face template for the user. As discussed above, in certain example embodiments, the determination can be made by the facial recognition module 318 or the face recognition module 238. If the current user facial image data does not match the stored face template for the user, the NO branch is followed to block 520, where the processor 300 employs the user verification module 336 to generate a notification. In one example embodiment, the notification can be that the current user facial image does not match the stored face template for the user. This notification can be sent for display to the user 105 at the user device 120. In addition, this notification can be associated with the user data and stored in the user data file 322 and/or transmitted to predetermined members of the online education institution for further fraud evaluation. In another example embodiment, the user 105 may be given a predetermined number of opportunities to get a facial recognition match. In that situation, the notification may be sent for display to the user and may notify the user of the failure to match and request that the user ensure they are properly in front of the camera 206 and the nothing is obscuring the view of the camera 206. The process may then go to either block 514 or block 582.

Returning to inquiry at block 518, if the current user facial image data does match the stored face template, the YES branch is followed to block 522. In block 522 the processor 300 employs the user verification module 336 to identify the known pattern for the biometric data device 208 in use by the user 110, based on, for example, received device identification data for the biometric data device 208. In one example embodiment, the biometric data device 208 is ear buds and the known pattern is as shown in 210. However, other biometric data devices, as discussed above, and other known patterns 210 may be substituted. In certain example embodiments, the user verification module 336 may obtain the known pattern from memory 310. Alternatively, in situations where the evaluation for the known pattern 210 takes place at the user device 120, the processor 220 employs the user verification module 252 to identify the known pattern for the biometric data device 208 in use by the user 110. In certain example embodiments, the user verification module 252 may obtain the known pattern from memory 230 or 310.

At block 524, the face recognition module 238 or the facial recognition module 318, using known facial recognition algorithms, may identify from the current user facial image data the area(s) where the biometric data device 208 is located. In example embodiments where the biometric data device 208 is ear buds 208, the particular module would identify the ear areas of the user in the current user facial image data for analysis to determine if the known pattern can be located.

At block 526, the known pattern 210 for the biometric data device 208 is compared to area(s) of the current user facial image data to determine if the known pattern 210 is identified in the current user facial image data. In example embodiments where the evaluation is conducted at the user device 120, the processor 220 may employ the user verification module 252 and the face recognition module 238 to evaluate the current user facial image data to determine if the one or more instances of the known pattern 210 are present using one or more known facial recognition algorithms. For example, if the biometric data device is ear buds 208, the user verification module 252 may determine that two instances of the known pattern 210 should be viewable (e.g., one on each ear bud next to each ear of the user 105). Once the comparison is completed, the processor 220 may employ the user verification module 252 to generate a notification to the user verification module 336 of the education server 110 with the results of the comparison. While the example embodiment presented describes two instances, the number of instances could be fewer or greater. In example embodiments where the evaluation is conducted at the education server 110, the processor 300 may employ the user verification module 336 and the facial recognition module 318 to evaluate the current user facial image data to determine if the one or more instances of the known pattern 210 are present using one or more known facial recognition algorithms.

At block 528, an inquiry is conducted to determine if one or more of the known pattern 210 is identified on the biometric data device 208. If the known pattern 210 is not identified in the current user facial image data, the NO branch is followed to block 530, where the processor 300 employs the user verification module 336 to generate a request for display on the user device 120 that the user put on/uncover the biometric data device 208 and/or the known pattern 210 on the device 208. The process then returns to block 514 to receive an updated current user facial image data.

Returning to block 528, if the known pattern 210 is identified in the current user facial image data, the YES branch is followed to block 532, where biometric data for the user is received via the biometric data device 208. In one example, the biometric data device is ear buds 208, which contain a heart rate sensor 212 that can receive and convey the heart rate of the user 105 when worn. While the remainder of the discussion of FIGS. 5A and 5B will describe the biometric data analysis with regard to heart rate data, other biometric data, as discussed above, may be substituted in the disclosed method. In one example embodiment, the heart rate data is received by the user verification module 252 at the user device 120. In another example embodiment, the heart rate data for the user 105 is transmitted by the user device 120 via the network 130 to the education server 110, where the user verification module 336 receives the heart rate data for evaluation.

At block 534, an inquiry is conducted to determine if the received heart rate data for the user is indicative of a live person. In one example embodiment where the evaluation is conducted at the user device 120, the user verification module 252 employs the bio sensor module 240 to evaluate the received user heart rate data against known patterns to determine if the received heart rate data is indicative of a live person. Once the evaluation is complete, the processor 220 can employ the user verification module 252 to transmit a notification to the user verification module 336 at the education server 110 via the online course website indicating the results of the evaluation. Alternatively, in example embodiments where the evaluation is conducted at the education server 110, the user verification module 336 employs the bio sensor module 320 to evaluate the received user heart rate data against known heart rate patterns to determine if the received heart rate data is indicative of a live person. If the received heart rate data is not indicative of a live user, the NO branch is followed to block 536, where the processor 300 employs the user verification module 336 to generate a notification for display on the user device 120 that the heart rate data does not indicate a live person and to request that the user 105 properly insert the ear buds 208 for heart rate analysis. The process may then return to block 532. In addition, or in the alternative, this notification can be associated with the user data and stored in the user data file 322 and/or transmitted to predetermined members of the online education institution for further fraud evaluation.

Returning to block 534, if the received heart rate data is indicative of a live user, the YES branch is followed to block 538, where the processor 300 employs the user verification module 336 to verify the user 105 as being authentic. At block 540, the received heart rate data may be associated with the user information for the user 105 and stored for subsequent evaluation and comparison. For example, in example embodiments where the heart rate data is maintained at the user device 120, the processor 220 may employ the user verification module 252 to associate the heart rate data with the user 105 and to store the heart rate data in the user heart rate data file 205. In example embodiments where the heart rate data is maintained at the education server, the processor 300 may employ the user verification module 336 to associate the heart rate data with the user 105 and to store the heart rate data in the historical heart rate data file 326.

The processor 300 may then employ the user verification module 336 to provide or continue providing the user 105 access to the desired educational information via the user device 120 and the network 130 at block 542.

At block 544, an inquiry is conducted to determine if a predetermined amount of time has passed since the verification of the user 105 was checked. The predetermined amount of time can be anywhere from 1 second to 120 minutes and can be configurable based on how often the online institution wants to re-verify and re-authenticate the user 105 or on the confidence of the system in the probability that the user 105 has been active working with the course content and has not been substituted. In one example embodiment, the determination as to whether a predetermined amount of time has passed can be made by the user verification module 336 of the education server 110. Alternatively, instead of using a predetermined time period to trigger when to re-verify the user, the trigger can be based on random sampling or based on when the user 105 takes a specific action (e.g., requests to take a test/quiz for a course, requests to answer questions or complete an assignment for a course, etc.). In further alternative embodiments, the trigger to re-verify the user 105 may be based on a determination by the bio sensor module 320 that the heart rate data received for the user 105 is substantially different than the historical heart rate data and may be an indication that someone else has replace the user 105 at the user device 120. If a predetermined amount of time has not passed, the NO branch is followed back to block 544. On the other hand, if a predetermined amount of time has passed, the YES branch is followed to block 546.

At block 546, current user facial image data is received from the camera 206 of the user device 120. In one example embodiment, the current user facial image data is received by the user verification module 252 of the user device 120. However, in situations where the facial recognition evaluation will take place at the education server 110, the processor 300 may employ the user verification module 336 to receive the current user facial image data from the user device 120 via the network 130.

At block 548, the current user facial image data is compared to the stored face template for the user 105. In example embodiments where the comparison occurs at the user device 120, the processor 220 may employ the user verification module 252 to receive the face template for the user 105 from the face template file 246 and can employ the face recognition module 238 to determine if the current user facial image data is sufficiently close to the face template to be considered a match. In example embodiments where the comparison occurs at the education server 110, the processor 300 may employ the user verification module 336 to receive the face template for the user 105 from the face templates file 324 and can employ the facial recognition module 318 to compare and determine if the current user facial image data is sufficiently close to the face template for the user 105 to be considered a match.

At block 550, an inquiry is conducted to determine if the current user facial image data matches the stored face template for the user 105. As discussed above, in certain example embodiments, the determination can be made by the facial recognition module 318 or the face recognition module 238. If the current user facial image data does not match the stored face template for the user 105, the NO branch is followed to block 552, where the processor 300 employs the user verification module 336 to generate a notification. In one example embodiment, the notification can be that the current user facial image does not match the stored face template for the user 105. This notification can be transmitted for display to the user 105 at the user device 120. In addition, this notification can be associated with the user data for the user 105 and stored in the user data file 322 and/or transmitted to predetermined members of the online education institution for further fraud evaluation. In another example embodiment, the user 105 may be given a certain number of opportunities to get a facial recognition match. In that situation, the notification may be sent for display to the user 105 and may notify the user 105 of the failure to match and request that the user 105 ensure they are properly in front of the camera 206 and the nothing is obscuring the view of the camera 206. The process may then return to either block 546 or block 582.

Returning to inquiry at block 550, if the current user facial image data does match the stored face template, the YES branch is followed to block 554. In block 554, the processor 300 employs the user verification module 336 to identify the known pattern for the biometric data device 208 in use by the user 105, based on, for example, received device identification data for the biometric data device 208. In one example embodiment, the biometric data device 208 is ear buds and the known pattern is as shown in 210. However, other biometric data devices, as discussed above, and other known patterns 210 may be substituted. In certain example embodiments, the user verification module 336 may obtain the known pattern from memory 310. Alternatively, in situations where the evaluation for the known pattern 210 takes place at the user device 120, the processor 220 employs the user verification module 252 to identify the known pattern for the biometric data device 208 in use by the user 105. In certain example embodiments, the user verification module 252 may obtain the known pattern from memory 230 or 310.

At block 556, the face recognition module 238 or the facial recognition module 318, using known facial recognition algorithms, may identify from the current user facial image data the area(s) where the biometric data device 208 is located. In example embodiments where the biometric data device 208 is ear buds 208, the particular module would identify the ear areas of the user 105 in the current user facial image data for analysis to determine if the known pattern can be located.

At block 558, the known pattern 210 for the biometric data device 208 is compared to area(s) of the current user facial image data to determine if the known pattern 210 is identified in the current user facial image data. In example embodiments where the evaluation is conducted at the user device 120, the processor 220 may employ the user verification module 252 and the face recognition module 238 to evaluate the current user facial image data to determine if the one or more instances of the known pattern 210 are present using one or more known facial recognition algorithms. For example, if the biometric data device is ear buds 208, the user verification module 252 may determine that two instances of the known pattern 210 should be viewable (e.g., one on each ear bud next to each ear of the user 105). Once the comparison is completed, the processor 220 may employ the user verification module 252 to generate a notification to the user verification module 336 of the education server 110 with the results of the comparison. In example embodiments where the evaluation is conducted at the education server 110, the processor 300 may employ the user verification module 336 and the facial recognition module 318 to evaluate the current user facial image data to determine if the one or more instances of the known pattern 210 are present using one or more known facial recognition algorithms.

At block 560, an inquiry is conducted to determine if one or more of the known pattern 210 is identified on the biometric data device 208. If the known pattern 210 is not identified in the current user facial image data, the NO branch is followed to block 562, where the processor 300 employs the user verification module 336 to generate a request for display on the user device 120 that the user 105 put on/uncover the biometric data device 208 and/or the known pattern 210 on the device 208. The process then returns to block 546 to receive an updated current user facial image data.

Returning to block 560, if the known pattern 210 is identified in the current user facial image data, the YES branch is followed to block 564, where biometric data, such as heart rate data, for the user 105 is received via the biometric data device 208. In one example embodiment, the heart rate data is received by the user verification module 252 at the user device 120. In another example embodiment, the heart rate data for the user 105 is transmitted by the user device 120 via the network 130 to the education server 110, where the user verification module 336 receives the heart rate data for evaluation.

At block 566, an inquiry is conducted to determine if the received heart rate data for the user 105 is indicative of a live person. In one example embodiment where the evaluation is conducted at the user device 120, the user verification module 252 employs the bio sensor module 240 to evaluate the received user heart rate data against known patterns to determine if the received heart rate data is indicative of a live person. Once the evaluation is complete, the processor 220 can employ the user verification module 252 to transmit a notification to the user verification module 336 at the education server 110 via the online course website indicating the results of the evaluation. Alternatively, in example embodiments where the evaluation is conducted at the education server 110, the user verification module 336 employs the bio sensor module 320 to evaluate the received user heart rate data against known heart rate patterns to determine if the received heart rate data is indicative of a live person. If the received heart rate data is not indicative of a live person, the NO branch is followed to block 568, where the processor 300 employs the user verification module 336 to generate a notification for display on the user device 120 that the heart rate data does not indicate a live person and to request that the user 105 properly insert the ear buds 208 for heart rate analysis. The process may then return to block 532. In addition, or in the alternative, this notification can be associated with the user data for the user 105 and stored in the user data file 322 and/or transmitted to predetermined members of the online education institution for further fraud evaluation.

Returning to block 566, if the received heart rate data is indicative of a live user 105, the YES branch is followed to block 570, where the stored heart rate data for the user 105 is retrieved for comparison. In one example embodiment, the stored heart rate data that is used for comparison is the most recent heart rate data received for the user 105. In certain example embodiments, the comparison is conducted at the user device 120 and the processor employs the user verification module 252 to retrieve the stored heart rate data from the user heart rate data file 250. In other example embodiments, the comparison is completed by the education server and the processor 300 employs the user verification module 336 to retrieve the stored heart rate data for the user 105 from the historical heart rate data file 326.

At block 572, the heart rate data received at block 564 is compared to the stored heart rate data for the user 105 to determine if the heart rate data matches and/or substantially matches the stored heart rate data. In example embodiments where the comparison is completed at the user device 120, the processor 220 can employ the bio sensors module 240 to compare the heart rate data to the stored heart rate data to determine if there is a match or substantial match using known matching algorithms and can generate a notification to the user verification module 336 of the education server 110 via the network 130 providing the results of the comparison. In example embodiments where the comparison is completed at the education server 110, the processor 300 can employ the bio sensor module 320 to compare the heart rate data to the stored heart rate data to determine if there is a match or substantial match using known matching algorithms. The lack of a match or substantial match between the most recent prior heart rate data and the current heart rate data for the user 105 may indicate that the user 105 has changed or is attempting to bypass the real-timer user verification system by providing artificial data.

At block 574, an inquiry is conducted to determine if the heart rate data matches or substantially matches the stored heart rate data for the user 105. If the heart rate data matches or substantially matches the stored heart rate data, the YES branch is followed to block 576, where the processor 300 employs the user verification module 336 to verify the user 105. The process then returns to block 540 of FIG. 5A.

Returning to block 574, if the heart rate data does not match or substantially match the stored heart rate data for the user 105, the NO branch is followed to block 578, where the processor 300 employs the user verification module 336 to generate a notification for display on the user device 120 that the heart rate data does not match or substantially match prior heart rate data for the user 105. In addition, the user 105 may be provided a predetermined number of attempts to correct the issue by having further heart rate data compared to stored heart rate data. In addition, or in the alternative, at block 580, this notification can be associated with the user data and stored in the user data file 322 and/or transmitted to predetermined members of the online education institution for further fraud evaluation. At block 582, the processor 300 may employ the user verification module 336 to prevent further access by the user 105 to the desired online course information. The process may then continue to the END block.

Figure 6:
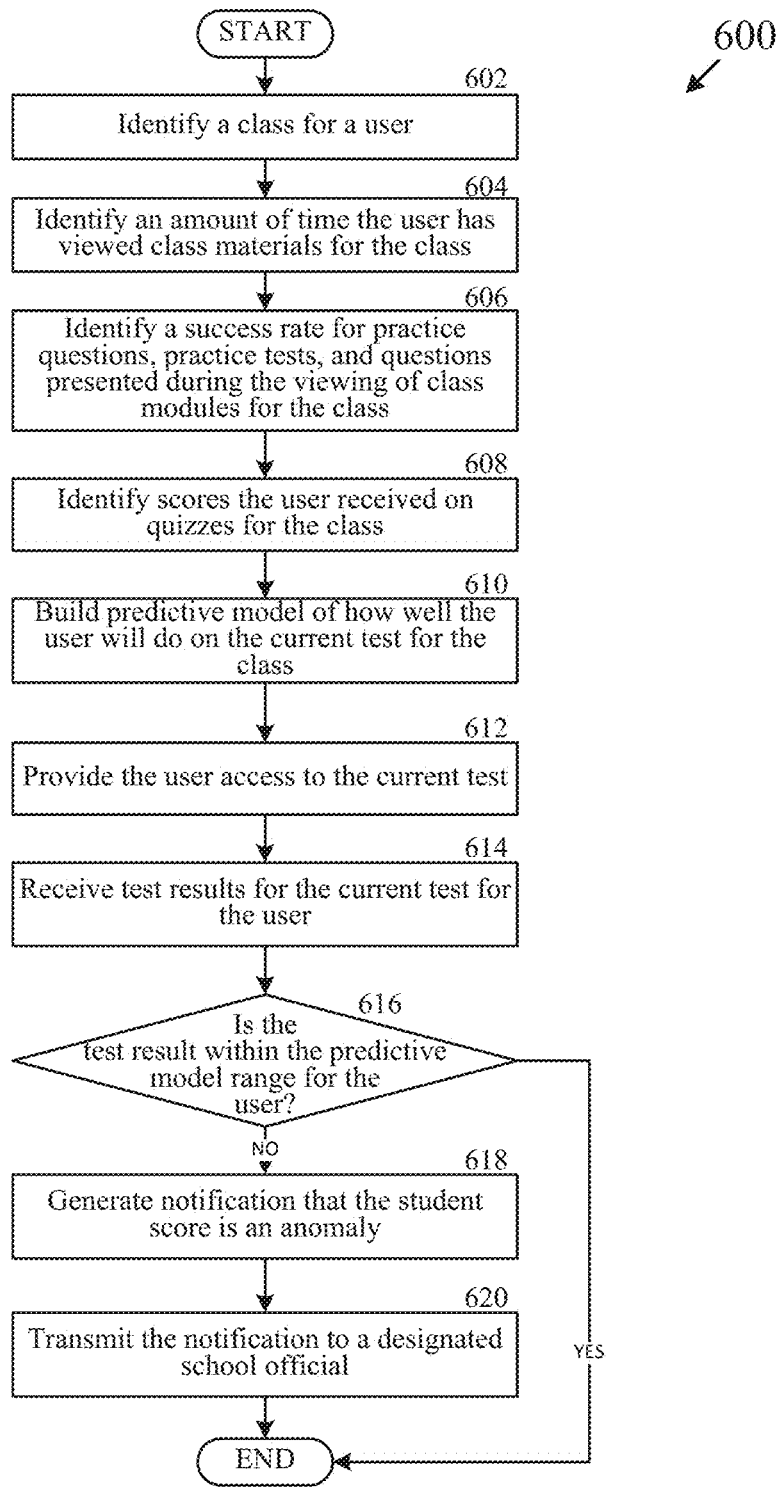
FIG. 6 is a flow chart illustrating an example method for predictive analysis of user success in an online education environment, in accordance with certain example embodiments of the disclosure.

FIG. 6 is a flow chart illustrating an example method 600 for predictive analysis of user success in an online education environment, in accordance with certain example embodiments of the disclosure. The method 600 may be performed by the education servers 110 and the processors 300 thereon. The example method 600 may be conducted in addition to or separate from the methods described in FIGS. 4, 5A, and 5B. Now referring to FIGS. 1-3 and 6, the exemplary method 600 begins at the START block and proceeds to block 602, where the processor 300 of the education server 110 identifies a class that is being taken by a user 105. For example, the processor 300 could employ the user verification module 336 and determine that the user 105 is about to take a test/quiz in a particular class.

At block 604, the processor 300 may employ the user verification module 336 to identify an amount of time that the user 105 has viewed class materials for the identified class. For example, the user verification module 336 may evaluate the records for the user 105 in the academic records file 330 to determine the amount and/or amount of time the user 105 has viewed class materials (e.g., lectures, labs, discussion sessions and boards, etc.) for the class. At block 606, the processor 300 may employ the user verification module 336 to identify the user's success rate (e.g., percentage correct) for practice questions, practices tests, and questions presented during the viewing of course lectures for the identified class. For example, the user verification module 336 may evaluate the records for the user 105 in the academic records file 330 to determine the user's success rate on practice tests and practice questions for the class. At block 608, the processor may employ the user verification module 336 to identify the prior scores the user 105 received on quizzes for the class. In one example embodiment, the user verification module 336 may evaluate the records for the user 105 in the academic records file 330 to determine the user's prior quiz scores in the class.

At block 610, the processor 300 may employ the user verification module 336 to build a predictive model of how well the user 105 will do on the current test for the identified class based on the identified amount/amount of time the user 105 has viewed class materials, the success rate of the user 105 taking practice questions, practice tests, and questions presented during class lectures or reviews, and prior quizzes taken by the user 105 in the class. Many different known forms of machine learning may be used to build the predictive model based on the factors outlined above. In certain example embodiments, fewer than all of the variables or additional variables may be included in building the predictive model. In one example embodiment, the predictive model of the user's success on the test may include a score range that the user 105 is expected to receive on the current test.

At block 612, the user 105 is provided access to the test via the online course website. In one example embodiment, the processor 300 may employ the user verification module 336 to monitor in real time the user's success (e.g., score) on the current test or may only evaluate the user's success after the user 105 has completed the current test. At block 614, the user verification module 336 may receive the current test results for the user 105. As discussed above, the results may represent only a portion of the current test or the entirety of the current test.

At block 616, an inquiry is conducted to determine if the test result is within the predictive model range for the user 105 for the class. In one example embodiment, the determination may be made by the user verification module 336 and may be based on a comparison of the test result to the range of scores provided by the predictive model. If the test result is within the predictive model range of scores, the YES branch is followed to the END block. Otherwise, the NO branch is followed to block 618. For example, the predictive model may predict based on the variables provided that the user 105 will receive between 70-82 on the test. If the user 105 were to receive a 98 on all or a portion of the test, it may signify the possibility that fraudulent activity is taking place.

At block 618, the processor 300 may employ the user verification module 336 to generate a notification that the user's score on the test is an anomaly (e.g., outside the bounds of the predictive model range of potential test scores). At block 620, the notification may be transmitted by the education server 110 to predetermined members of the online education institution for further fraud evaluation. The notification may also be sent for display to the user 105 at the user device 120. In addition or in the alternative, this notification can be associated with the user data and stored in the user data file 322. The method 600 may then proceed to the END block.

Figure 7:
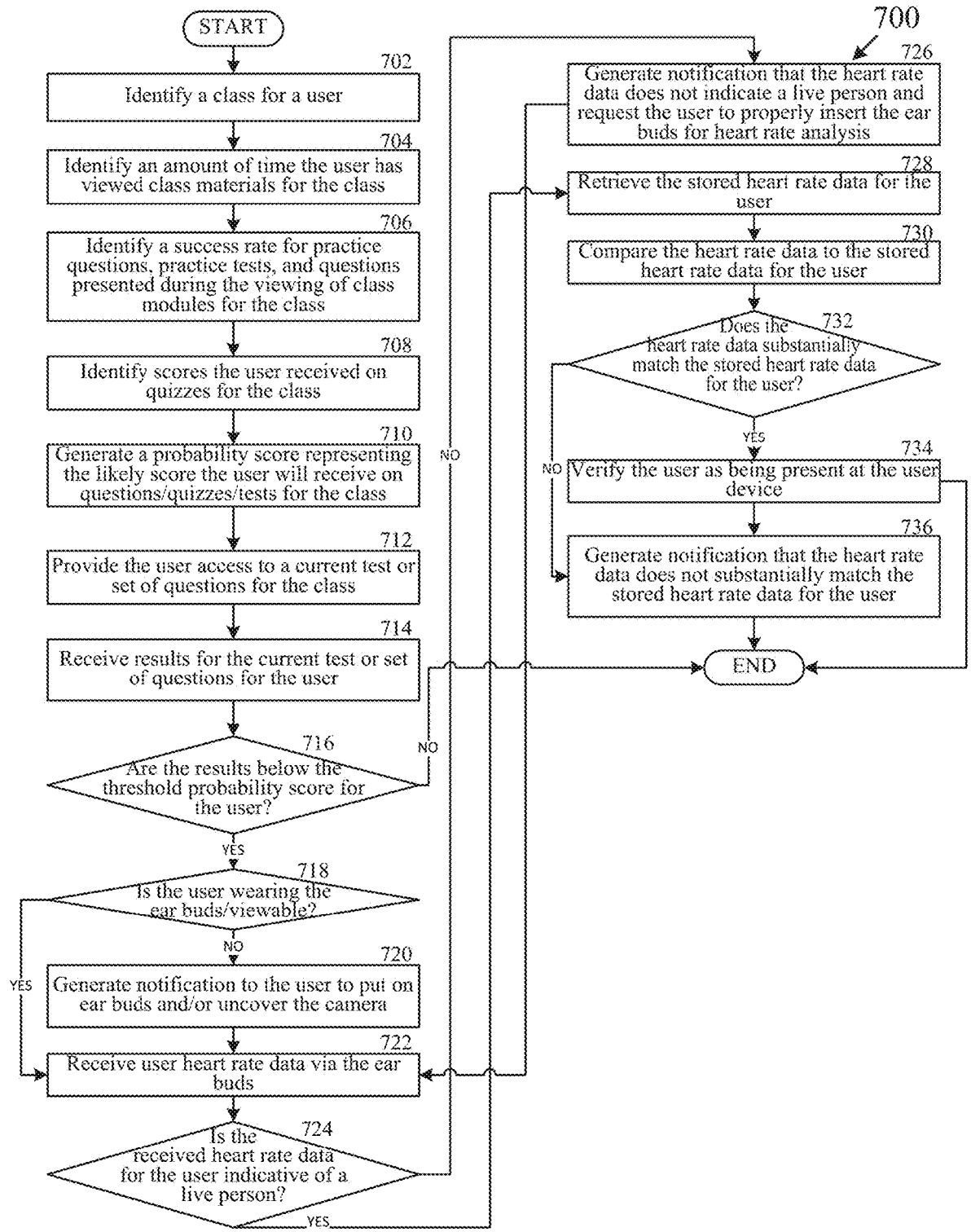
FIG. 7 is a flow chart illustrating an example method for determining when to conduct user verification in an online education environment, in accordance with certain example embodiments of the disclosure.

FIG. 7 is a flow chart illustrating an example method 700 for determining when to conduct real-time user verification in an online education environment, in accordance with certain example embodiments of the disclosure. The method 700 may be performed by the education servers 110 and the processors 300 thereon. The example method 700 may be conducted in addition to or separate from the methods described in FIGS. 4-6. Now referring to FIGS. 1-3 and 7, the exemplary method 700 begins at the START block and proceeds to block 702, where the processor 300 of the education server 110 identifies a class that is being taken by a user 105. For example, the processor 300 could employ the user verification module 336 and determine that the user 105 is about to take a test/quiz or answer a set of questions in a particular class.

At block 704, the processor 300 may employ the user verification module 336 to identify an amount and/or amount of time that the user 105 has viewed class materials for the identified class. For example, the user verification module 336 may evaluate the records for the user 105 in the academic records file 330 to determine the amount and/or amount of time the user 105 has viewed class materials (e.g., lectures, labs, discussion sessions and boards, etc.) for the class. At block 706, the processor 300 may employ the user verification module 336 to identify the user's success rate (e.g., percentage correct) for practice questions, practices tests, and questions presented during the viewing of course lectures for the identified class. For example, the user verification module 336 may evaluate the records for the user 105 in the academic records file 330 to determine the user's success rate on practice tests and practice questions for the class. At block 708, the processor may employ the user verification module 336 to identify the prior scores the user 105 received on quizzes for the class. In one example embodiment, the user verification module 336 may evaluate the records for the user 105 in the academic records file 330 to determine the user's prior quiz scores in the class.

At block 710, the processor 300 may employ the user verification module 336 to generate a probability score of how well the user 105 will do on the current test/quiz/question set for the identified class based on the identified amount/amount of time the user 105 has viewed class materials, the success rate of the user 105 taking practice questions, practice tests, and questions presented during class lectures or reviews, and prior quizzes taken by the user 105 in the class. Many different known forms of machine learning may be used to build the probability score based on the factors outlined above. In certain example embodiments, fewer than all of the variables or additional variables may be included in building the probability score. In one example embodiment, the probability score of the user's success on the test/quiz/set of questions may include a score range that the user 105 is expected to receive on the current test/quiz/set of questions.

At block 712, the user 105 is provided access to the test/quiz/set of questions via the online course website. In one example embodiment, the processor 300 may employ the user verification module 336 to monitor, in real time, the user's success (e.g., score) on the current test/quiz/set of questions or may only evaluate the user's success after the user 105 has completed the current test/quiz/set of questions. At block 714, the user verification module 336 may receive the current score results for the user 105. As discussed above, the results may represent only a portion of the current test/quiz/set of questions or the entirety of the current test/quiz/set of questions.

At block 716, an inquiry is conducted to determine if the actual results meet or exceed the threshold probability score for the user 105 for the particular assignment for the class. In one example embodiment, the determination may be made by the user verification module 336 and may be based on a comparison of the actual results to the threshold probability score generated. If the actual results are greater than or equal to the threshold probability score, the NO branch is followed to the END block. Otherwise, the YES branch is followed to block 718. For example, the probability score may predict, based on the variables provided, that the user 105 should not be scoring less than an 80 on tests/quizzes and/or a set or questions. If the user 105 were to receive a 75 on all or a portion of the test/quiz/set of questions, it may signify that the user 105 should receive additional user verification checks and it should be verified that the user 105 is wearing their ear buds 208.

At block 718, an inquiry is conducted to determine if the user 105 is wearing their ear buds 208 and/or if the ear buds 208 and/or user 105 are viewable by the camera 206. In certain example embodiments, the determination may be made by the user verification module 336. If the user 105 is not wearing the ear buds 208 or they are not viewable by the camera 206 or the user 105 is not viewable by the camera 206, the NO branch is followed to block 720. Otherwise, the YES branch is followed to block 722.

At block 720, the processor 300 employs the user verification module 336 to generate a request for display on the user device 120 that the user 105 put on/uncover the biometric data device 208 and/or the known pattern 210 on the device 208. At block 722, biometric data, such as heart rate data, for the user 105 is received via the ear buds 208. In one example embodiment, the heart rate data is received by the user verification module 252 at the user device 120. In another example embodiment, the heart rate data for the user 105 is transmitted by the user device 120 via the network 130 to the education server 110, where the user verification module 336 receives the heart rate data for evaluation.

At block 724, an inquiry is conducted to determine if the received heart rate data for the user 105 is indicative of a live person. In one example embodiment where the evaluation is conducted at the user device 120, the user verification module 252 employs the bio sensor module 240 to evaluate the received user heart rate data against known patterns to determine if the received heart rate data is indicative of a live person. Once the evaluation is complete, the processor 220 can employ the user verification module 252 to transmit a notification to the user verification module 336 at the education server 110 via the online course website indicating the results of the evaluation. Alternatively, in example embodiments where the evaluation is conducted at the education server 110, the user verification module 336 employs the bio sensor module 320 to evaluate the received user heart rate data against known heart rate patterns to determine if the received heart rate data is indicative of a live person. If the received heart rate data is not indicative of a live person, the NO branch is followed to block 726, where the processor 300 employs the user verification module 336 to generate a notification for display on the user device 120 that the heart rate data does not indicate a live person and to request that the user 105 properly insert the ear buds 208 for heart rate analysis. The process may then return to block 722. In addition, or in the alternative, this notification can be associated with the user data for the user 105 and stored in the user data file 322 and/or transmitted to predetermined members of the online education institution for further fraud evaluation.

Returning to block 724, if the received heart rate data is indicative of a live user, the YES branch is followed to block 728, where the stored heart rate data for the user 105 is retrieved for comparison. In one example embodiment, the stored heart rate data that is used for comparison is the most recent heart rate data received for the user 105. In certain example embodiments, the comparison is conducted at the user device 120 and the processor 220 employs the user verification module 252 to retrieve the stored heart rate data from the user heart rate data file 250. In other example embodiments, the comparison is completed by the education server 110 and the processor 300 employs the user verification module 336 to retrieve the stored heart rate data for the user 105 from the historical heart rate data file 326.

At block 730 the heart rate data received at block 564 is compared to the stored heart rate data for the user 105 to determine if the heart rate data matches and/or substantially matches the stored heart rate data. In example embodiments where the comparison is completed at the user device 120, the processor 220 can employ the bio sensors module 240 to compare the heart rate data to the stored heart rate data to determine if there is a match or substantial match using known matching algorithms and can generate a notification to the user verification module 336 of the education server 110 via the network 130 providing the results of the comparison. In example embodiments where the comparison is completed at the education server 110, the processor 300 can employ the bio sensor module 320 to compare the heart rate data to the stored heart rate data to determine if there is a match or substantial match using known matching algorithms. The lack of a match or substantial match between the most recent prior heart rate data and the current heart rate data for the user 105 may indicate that the user 105 has changed or is attempting to bypass the real-time user verification system by providing artificial data.

At block 732, an inquiry is conducted to determine if the heart rate data matches or substantially matches the stored heart rate data for the user 105. If the heart rate data matches or substantially matches the stored heart rate data, the YES branch is followed to block 734, where the processor 300 employs the user verification module to verify the user 105 is authentic. The process then continues to the END block.

Returning to block 732, if the heart rate data does not match or substantially match the stored heart rate data for the user 105, the NO branch is followed to block 736, where the processor 300 employs the user verification module 336 to generate a notification for display on the user device 120 that the heart rate data does not match or substantially match prior heart rate data for the user 105. In addition, the user 105 may be provided a predetermined number of attempts to correct the issue by having further heart rate data compared to stored heart rate data. In addition, or in the alternative, this notification can be associated with the user data and stored in the user data file 322 and/or transmitted to predetermined members of the online education institution for further fraud evaluation.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain example embodiments, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example embodiments of the disclosure may include a computer-implemented method that may include: receiving, by an education server comprising one or more processors from a user device, user identifying information associated with a user at the user device; receiving, by the education server from the user device, a request to access online education content; determining, by the education server and based at least in part on the user identifying information, a face template based on historical facial image data for the user; comparing, by the education server, the current facial image data from the user device to the historical facial image data for the user to determine if the current facial image data matches the face template for the user; receiving, by the education server, a biometric sensor data for the user; determining, by the education server and based at least in part on the biometric sensor data, if the user is located at the user device; and verifying, by the education server, the user to access the online education content, wherein verifying comprises facilitating, by the education server and based at least in part on the determination that the current facial image data matches the face template for the user and the biometric sensor data indicates the user is located at the user device, access to the online education content by the user device.

Further example embodiments may include the computer-implemented method that may include: determining, by the education server and based at least in part on the user identifying information, a stored device ID for a first device associated with the user; and comparing, by the education server, a current device ID for the user device to the stored device ID to determine if the current device ID matches the stored device ID; wherein facilitating access to the online education content is further based at least in part on the determination that the current device ID matches the stored device ID.

Further still, example embodiments of the disclosure may include a computer-implemented method that may include: determining, by the education server and based at least in part on the user identifying information, a biometric data device associated with the user; determining, by the education server, a known pattern on an exterior of the biometric data device; and evaluating, by the education server, the current facial image data to determine if the current facial image data comprises the known pattern on the exterior of the biometric data device; wherein facilitating access to the online education content is further based at least in part on the determination that the current facial image data comprises the known pattern on the exterior of the biometric data device. Further still, the biometric data device may comprise ear buds, wherein the ear buds comprise a heart rate monitor for receiving heart rate data of the user, and wherein the biometric sensor data comprises the heart rate data for the user.

Further example embodiments may include the biometric sensor data comprising heart rate data of the user, wherein the computer-implemented method may also include: determining, by the education server, that a predetermined amount of time has passed since the user was verified to access the online education content; receiving, by the education server, a current heart rate data for the user; accessing, by the education server, historical heart rate data for the user; comparing, by the education server, the current heart rate data for the user to the historical heart rate data for the user to determine if the historical heart rate data and the current heart rate data are from a same user; and facilitating, by the education server and based at least in part on the determination that the historical heart rate data and the current heart rate data are from the same user, access to the online education content by the user device. In addition, example embodiments may include the computer implemented method that may include: identifying, by the education server, an online education course enrolled in by the user; determining, by the education server, a test to be provided to the user for the online education course; identifying, by the education server, a plurality of historical education data for the user in the online education course; generating, by the education server and based at least in part on the plurality of historical education data, a predictive model of success for the user on the test, wherein the predictive model comprises a test score range comprising a maximum test score threshold; receiving, by the education server, a test result for the user on the test; comparing, by the education server, the test result for the user to the maximum test score threshold; and generating, by the education server and based on the determination that the test result is greater than the maximum test score threshold, a notification that the test result violates the maximum test core threshold for the user in the online education course.

Further example embodiments may include the computer-implemented method that may include: identifying, by the education server, an online education course enrolled in by the user; identifying, by the education server, a plurality of historical education data for the user in the online education course; generating, by the education server and based at least in part on the plurality of historical education data, a probability score for the user on an online course assignment, wherein the probability score comprises a minimum score threshold; receiving, by the education server, a score for the user on the online course assignment; comparing, by the education server, the score for the user on the online course assignment to the minimum score threshold; identifying, by the education server and based on the determination that the score is less than the minimum score threshold, if the user is wearing a biometric data device; and generating, by the education server and based at least in part on the identification that the user is not wearing the biometric data device and the score is less than the minimum score threshold, a notification to the user to put on the biometric data device. Further, example embodiments may include: preventing, by the education server, user access to the online education content based at least in part on the determination that current facial image data does not match the face template for the user or the biometric sensor data does not indicate the user is located at the user device.

Still further example embodiments of the disclosure may include: a non-transitory computer-readable media comprising computer-executable instructions that, when executed by one or more processors, configure the one or more processors to perform operations comprising: receiving, from a user device, user identifying information associated with a user at the user device; receiving, from the user device, a request to access online education content; determining, based at least in part on the user identifying information, a face template based on historical facial image data for the user; comparing the current facial image data from the user device to the historical facial image data for the user to determine if the current facial image data matches the face template for the user; receiving a biometric sensor data for the user; determining, based at least in part on the biometric sensor data, if the user is located at the user device; and verifying the user to access the online education content, wherein verifying comprises facilitating, based at least in part on the determination that the current facial image data matches the face template for the user and the biometric sensor data indicates the user is located at the user device, access to the online education content by the user device.

Yet further example embodiments may include the non-transitory computer-readable media, wherein the operations may further include: determining, based at least in part on the user identifying information, a stored device ID for a first device associated with the user; and comparing a current device ID for the user device to the stored device ID to determine if the current device ID matches the stored device ID; wherein facilitating access to the online education content is further based at least in part on the determination that the current device ID matches the stored device ID. Still further example embodiments may include the non-transitory computer-readable media, wherein the operations may further include: determining, based at least in part on the user identifying information, a biometric data device associated with the user; determining a known pattern on an exterior of the biometric data device; and evaluating, the current facial image data to determine if the current facial image data comprises the known pattern on the exterior of the biometric data device; wherein facilitating access to the online education content is further based at least in part on the determination that the current facial image data comprises the known pattern on the exterior of the biometric data device. Further, example embodiments may include the non-transitory computer-readable media, wherein the biometric data device comprises ear buds, wherein the ear buds comprise a heart rate monitor for receiving heart rate data of the user, and wherein the biometric sensor data comprises the heart rate data for the user.

In addition, example embodiments may include the biometric sensor data comprising heart rate data of the user, wherein the operations of the non-transitory computer-readable media may further include: determining that a predetermined amount of time has passed since the user was verified to access the online education content; receiving a current heart rate data for the user; accessing historical heart rate data for the user; comparing the current heart rate data for the user to the historical heart rate data for the user to determine if the historical heart rate data and the current heart rate data are from a same user; and facilitating, based at least in part on the determination that the historical heart rate data and the current heart rate data are from the same user, access to the online education content by the user device. Yet further, example embodiments may include the non-transitory computer-readable media, wherein the operations may further include: identifying an online education course enrolled in by the user; determining a test to be provided to the user for the online education course; identifying a plurality of historical education data for the user in the online education course; generating, based at least in part on the plurality of historical education data, a predictive model of success for the user on the test, wherein the predictive model comprises a test score range comprising a maximum test score threshold; receiving a test result for the user on the test; comparing the test result for the user to the maximum test score threshold; and generating, based on the determination that the test result is greater than the maximum test score threshold, a notification that the test result violates the maximum test core threshold for the user in the online education course.

Still further, example embodiments may include the non-transitory computer-readable media, wherein the operations may further include: identifying an online education course enrolled in by the user; identifying a plurality of historical education data for the user in the online education course; generating, and based at least in part on the plurality of historical education data, a probability score for the user on an online course assignment, wherein the probability score comprises a minimum score threshold; receiving a score for the user on the online course assignment; comparing the score for the user on the online course assignment to the minimum score threshold; identifying, based on the determination that the score is less than the minimum score threshold, if the user is wearing a biometric data device; and generating, based at least in part on the identification that the user is not wearing the biometric data device and the score is less than the minimum score threshold, a notification to the user to put on the biometric data device. In addition, example embodiments may include the non-transitory computer-readable media, wherein the operations may further include: preventing user access to the online education content based at least in part on the determination that current facial image data does not match the face template for the user or the biometric sensor data does not indicate the user is located at the user device.

Further example embodiments of the disclosure may include a system, comprising: at least one memory that stores computer-executable instructions and at least one processor configured to access the at least one memory, wherein the at least one processor is configured to execute the computer-executable instructions to: receive, from a user device, user identifying information associated with a user at the user device; receive, from the user device, a request to access online education content; determine, based at least in part on the user identifying information, a face template based on historical facial image data for the user; compare the current facial image data from the user device to the historical facial image data for the user to determine if the current facial image data matches the face template for the user; receive a biometric sensor data for the user; determine, based at least in part on the biometric sensor data, if the user is located at the user device; and verify the user to access the online education content, wherein verifying comprises facilitating, based at least in part on the determination that the current facial image data matches the face template for the user and the biometric sensor data indicates the user is located at the user device, access to the online education content by the user device.

Example embodiments of the system, may further include: the at least one processor being further configured to execute the computer-executable instructions to determine, based at least in part on the user identifying information, a stored device ID for a first device associated with the user; and compare a current device ID for the user device to the stored device ID to determine if the current device ID matches the stored device ID; wherein facilitating access to the online education content is further based at least in part on the determination that the current device ID matches the stored device ID. Example embodiments of the system may further include: the at least one processor being further configured to execute the computer-executable instructions to determine, based at least in part on the user identifying information, a biometric data device associated with the user; determine a known pattern on an exterior of the biometric data device; and evaluate, the current facial image data to determine if the current facial image data comprises the known pattern on the exterior of the biometric data device; wherein facilitating access to the online education content is further based at least in part on the determination that the current facial image data comprises the known pattern on the exterior of the biometric data device. In further example embodiments of the system, the biometric data device comprises ear buds, wherein the ear buds comprise a heart rate monitor for receiving heart rate data of the user, and wherein the biometric sensor data comprises the heart rate data for the user.

Example embodiments of the system, may further include the biometric sensor data comprising heart rate data of the user, wherein the at least one processor is further configured to execute the computer-executable instructions to: determine that a predetermined amount of time has passed since the user was verified to access the online education content; receive a current heart rate data for the user; access historical heart rate data for the user; compare the current heart rate data for the user to the historical heart rate data for the user to determine if the historical heart rate data and the current heart rate data are from a same user; and facilitate, based at least in part on the determination that the historical heart rate data and the current heart rate data are from the same user, access to the online education content by the user device. Example embodiments of the system, may further include: the at least one processor being further configured to execute the computer-executable instructions to identifying an online education course enrolled in by the user; determine a test to be provided to the user for the online education course; identify a plurality of historical education data for the user in the online education course; generate based at least in part on the plurality of historical education data, a predictive model of success for the user on the test, wherein the predictive model comprises a test score range comprising a maximum test score threshold; receive a test result for the user on the test;

compare the test result for the user to the maximum test score threshold; and generate, based on the determination that the test result is greater than the maximum test score threshold, a notification that the test result violates the maximum test core threshold for the user in the online education course.

Example embodiments of the system, may further include: the at least one processor being further configured to execute the computer-executable instructions to identify an online education course enrolled in by the user; identify a plurality of historical education data for the user in the online education course; generate, and based at least in part on the plurality of historical education data, a probability score for the user on an online course assignment, wherein the probability score comprises a minimum score threshold; receive a score for the user on the online course assignment; compare the score for the user on the online course assignment to the minimum score threshold; identify, based on the determination that the score is less than the minimum score threshold, if the user is wearing a biometric data device; and generate, based at least in part on the identification that the user is not wearing the biometric data device and the score is less than the minimum score threshold, a notification to the user to put on the biometric data device. Example embodiments of the system, may further include: the at least one processor being further configured to execute the computer-executable instructions to prevent user access to the online education content based at least in part on the determination that current facial image data does not match the face template for the user or the biometric sensor data does not indicate the user is located at the user device.

Further example embodiments of the disclosure may include an apparatus comprising: at least one memory storing computer-executable instructions; and at least one processor, wherein the at least one processor is configured to access the at least one memory and to execute the computer-executable instructions to: receive, from a user device, user identifying information associated with a user at the user device; receive, from the user device, a request to access online education content; determine, based at least in part on the user identifying information, a face template based on historical facial image data for the user; compare the current facial image data from the user device to the historical facial image data for the user to determine if the current facial image data matches the face template for the user; receive a biometric sensor data for the user; determine, based at least in part on the biometric sensor data, if the user is located at the user device; and verify the user to access the online education content, wherein verification comprises facilitating, based at least in part on the determination that the current facial image data matches the face template for the user and the biometric sensor data indicates the user is located at the user device, access to the online education content by the user device.

Example embodiments of the apparatus may further include: the at least one processor being further configured to execute the computer-executable instructions to: determine, based at least in part on the user identifying information, a stored device ID for a first device associated with the user; and compare a current device ID for the user device to the stored device ID to determine if the current device ID matches the stored device ID; wherein facilitating access to the online education content is further based at least in part on the determination that the current device ID matches the stored device ID. In addition, example embodiments of the apparatus may also include: the at least one processor being further configured to execute the computer-executable instructions to: determine, based at least in part on the user identifying information, a biometric data device associated with the user; determine a known pattern on an exterior of the biometric data device; and evaluate, the current facial image data to determine if the current facial image data comprises the known pattern on the exterior of the biometric data device; wherein facilitating access to the online education content is further based at least in part on the determination that the current facial image data comprises the known pattern on the exterior of the biometric data device. Further, example embodiments of the apparatus may include the biometric data device comprising ear buds, wherein the ear buds comprise a heart rate monitor for receiving heart rate data of the user, and wherein the biometric sensor data comprises the heart rate data for the user.

Still further, example embodiments of the apparatus may include: the at least one processor being further configured to execute the computer-executable instructions to: determine that a predetermined amount of time has passed since the user was verified to access the online education content; receive a current heart rate data for the user; access historical heart rate data for the user; compare the current heart rate data for the user to the historical heart rate data for the user to determine if the historical heart rate data and the current heart rate data are from a same user; and facilitate, based at least in part on the determination that the historical heart rate data and the current heart rate data are from the same user, access to the online education content by the user device. Example embodiments of the apparatus may also include: the at least one processor being further configured to execute the computer-executable instructions to: identify an online education course enrolled in by the user; determine a test to be provided to the user for the online education course; identify a plurality of historical education data for the user in the online education course; generate based at least in part on the plurality of historical education data, a predictive model of success for the user on the test, wherein the predictive model comprises a test score range comprising a maximum test score threshold; receive a test result for the user on the test; compare the test result for the user to the maximum test score threshold; and generate, based on the determination that the test result is greater than the maximum test score threshold, a notification that the test result violates the maximum test core threshold for the user in the online education course.

Still further, example embodiments of the apparatus may also include: the at least one processor being further configured to execute the computer-executable instructions to: identify an online education course enrolled in by the user; identify a plurality of historical education data for the user in the online education course; generate, and based at least in part on the plurality of historical education data, a probability score for the user on an online course assignment, wherein the probability score comprises a minimum score threshold; receive a score for the user on the online course assignment; compare the score for the user on the online course assignment to the minimum score threshold; identify, based on the determination that the score is less than the minimum score threshold, if the user is wearing a biometric data device; and generate, based at least in part on the identification that the user is not wearing the biometric data device and the score is less than the minimum score threshold, a notification to the user to put on the biometric data device. In addition, example embodiments of the apparatus may include: the at least one processor being further configured to execute the computer-executable instructions to prevent user access to the online education content based at least in part on the determination that current facial image data does not match the face template for the user or the biometric sensor data does not indicate the user is located at the user device.

Additional example embodiments of the disclosure may include: a system comprising: a means for receiving, from a user device, user identifying information associated with a user at the user device; a means for receiving, from the user device, a request to access online education content; a means for determining, based at least in part on the user identifying information, a face template based on historical facial image data for the user; a means for comparing the current facial image data from the user device to the historical facial image data for the user to determine if the current facial image data matches the face template for the user; a means for receiving a biometric sensor data for the user; a means for determining, based at least in part on the biometric sensor data, if the user is located at the user device; and a means for verifying the user for access to the online education content, wherein verifying comprises a means for facilitating, based at least in part on the determination that the current facial image data matches the face template for the user and the biometric sensor data indicates the user is located at the user device, access to the online education content by the user device.

In addition, example embodiments of the system may include: a means for determining, based at least in part on the user identifying information, a stored device ID for a first device associated with the user; and a means for comparing a current device ID for the user device to the stored device ID to determine if the current device ID matches the stored device ID; wherein facilitating access to the online education content is further based at least in part on the determination that the current device ID matches the stored device ID. Further, example embodiments of the system may also include: a means for determining, based at least in part on the user identifying information, a biometric data device associated with the user; a means for determining a known pattern on an exterior of the biometric data device; and a means for evaluating the current facial image data to determine if the current facial image data comprises the known pattern on the exterior of the biometric data device; wherein facilitating access to the online education content is further based at least in part on the determination that the current facial image data comprises the known pattern on the exterior of the biometric data device. Still further, example embodiments of the system may include: the biometric data device comprising ear buds, wherein the ear buds comprise a heart rate monitor for receiving heart rate data of the user, and wherein the biometric sensor data comprises the heart rate data for the user.

The example embodiments of the system may also include: the biometric sensor data comprising heart rate data of the user, wherein the system further comprises: means for determining that a predetermined amount of time has passed since the user was verified to access the online education content; means for receiving a current heart rate data for the user; means for accessing historical heart rate data for the user; means for comparing the current heart rate data for the user to the historical heart rate data for the user to determine if the historical heart rate data and the current heart rate data are from a same user; and means for facilitating, based at least in part on the determination that the historical heart rate data and the current heart rate data are from the same user, access to the online education content by the user device. In addition, example embodiments of the system may include: means for identifying an online education course enrolled in by the user; means for determining a test to be provided to the user for the online education course; means for identifying a plurality of historical education data for the user in the online education course; means for generating, based at least in part on the plurality of historical education data, a predictive model of success for the user on the test, wherein the predictive model comprises a test score range comprising a maximum test score threshold; means for receiving a test result for the user on the test; means for comparing the test result for the user to the maximum test score threshold; and means for generating, based on the determination that the test result is greater than the maximum test score threshold, a notification that the test result violates the maximum test core threshold for the user in the online education course.

Furthermore, example embodiments of the system may also include: means for identifying an online education course enrolled in by the user; means for identifying a plurality of historical education data for the user in the online education course; means for generating, based at least in part on the plurality of historical education data, a probability score for the user on an online course assignment, wherein the probability score comprises a minimum score threshold; means for receiving a score for the user on the online course assignment; means for comparing the score for the user on the online course assignment to the minimum score threshold; means for identifying, based on the determination that the score is less than the minimum score threshold, if the user is wearing a biometric data device; and means for generating, based at least in part on the identification that the user is not wearing the biometric data device and the score is less than the minimum score threshold, a notification to the user to put on the biometric data device. In addition, example embodiments of the system may include: means for preventing user access to the online education content based at least in part on the determination that current facial image data does not match the face template for the user or the biometric sensor data does not indicate the user is located at the user device.

The claimed invention is:

1. An apparatus to monitor user access to online content, the apparatus comprising:
   memory; and
   programmable circuitry to at least one of execute or instantiate instructions to at least:
   compare a score associated with a user corresponding to an online course assignment to a score threshold to determine that the score does not satisfy the score threshold;
   process an image of the user captured by a sensor to determine that the user is not wearing a biometric data device based on an identification of a pattern included on the biometric data device in the image, the pattern matching a known pattern;
   output, via a user interface, a notification to the user to put on the biometric data device based on the determination that the user is not wearing the biometric data device;
   after determining that the user is wearing the biometric data device, obtain biometric data from the biometric data device; and
   verify an identity of the user by comparing the biometric data to previous biometric data associated with the user.

2. The apparatus of claim 1, wherein the programmable circuitry is to:
   identify an online education course enrolled in by the user;
   identify historical education data associated with the user corresponding to the online education course; and
   generate, based at least in part on the historical education data, a probability score associated with the user corresponding to the online course assignment, the score threshold corresponding to the probability score.

3. The apparatus of claim 1, wherein the programmable circuitry is to identify an amount of time the user has viewed class materials for a class corresponding to the online course assignment, the score threshold corresponding to the amount of time.

4. The apparatus of claim 1, wherein the programmable circuitry is to:
   detect a heart rate from the biometric data device in response to the notification; and
   compare the heart rate from the biometric data device to a stored heart rate corresponding to the user to determine if the user is present.

5. The apparatus of claim 4, wherein the notification is a first notification, the programmable circuitry to:
   generate a second notification that the heart rate does not correspond to the stored heart rate; and
   output the second notification to at least one of the user interface or an external server.

6. The apparatus of claim 4, wherein the programmable circuitry is to verify that the user is authentic based on the comparison of the heart rate to the stored heart rate.

7. A computer-implemented method to verify user access to online content, the method comprising:
   determining a score threshold for a user based on historical data corresponding to the user;
   determining, by executing an instruction with programmable circuitry, that a score associated with the user corresponding to an online course assignment does not satisfy the score threshold;
   processing, by executing an instruction with the programmable circuitry, an image of the user captured by a sensor to determine that the user is not wearing a biometric data device based on an identification of a pattern included on the biometric data device in the image, the pattern matching a known pattern;

generating, by executing an instruction with the programmable circuitry, a notification to the user to put on the biometric data device;

after determining that the user is wearing the biometric data device, obtaining biometric data from the biometric data device; and verifying an identity of the user by comparing the biometric data to previous biometric data associated with the user.

8. The method of claim 7, further including:

identifying an online education course enrolled in by the user;

identifying the historical data based on the online education course; and generating, based at least in part on the historical data, a probability score associated with the user corresponding to the online course assignment, the score threshold corresponding to the probability score.

9. The method of claim 7, further including identifying an amount of time the user has viewed class materials for a class corresponding to the online course assignment, the score threshold corresponding to the amount of time.

10. The method of claim 7, further including:

detecting a heart rate from the biometric data device in response to the notification; and comparing the heart rate from the biometric data device to a stored heart rate corresponding to the user to determine if the user is present.

11. The method of claim 10, wherein the notification is a first notification, further including:

generating a second notification that the heart rate does not correspond to the stored heart rate; and outputting the second notification to at least one of a user interface or an external server.

12. The method of claim 10, further including verifying that the user is authentic based on the comparison of the heart rate to the stored heart rate.

13. At least one non-transitory computer readable medium comprising instructions to cause one or more processor circuits to at least:

compare a score associated with a user corresponding to an online course assignment to a score threshold to determine that the score does not satisfy the score threshold;

process an image of the user captured by a sensor to determine that the user is not wearing a biometric data device based on an identification of a pattern included on the biometric data device in the image, the pattern matching a known pattern;

output, via a user interface, a notification to the user to put on the biometric data device based on the determination that the user is not wearing the biometric data device;

after determining that the user is wearing the biometric data device, obtain biometric data from the biometric data device; and verify an identity of the user by comparing the biometric data to previous biometric data associated with the user.

14. The non-transitory computer readable medium of claim 13, wherein the instructions are to cause at least one of the one or more processor circuits to:

identify an online education course enrolled in by the user;

identify historical education data associated with the user corresponding to the online education course; and generate, based at least in part on the historical education data, a probability score associated with the user corresponding to the online course assignment, the score threshold corresponding to the probability score.

15. The non-transitory computer readable medium of claim 13, wherein the instructions are to cause at least one of the one or more processor circuits to identify an amount of time the user has viewed class materials for a class corresponding to the online course assignment, the score threshold corresponding to the amount of time.

16. The non-transitory computer readable medium of claim 13, wherein the instructions are to cause at least one of the one or more processor circuits to:

detect a heart rate from the biometric data device in response to the notification; and compare the heart rate from the biometric data device to a stored heart rate corresponding to the user to determine if the user is present.

17. The non-transitory computer readable medium of claim 16, wherein the notification is a first notification, the instructions to cause at least one of the one or more processor circuits to:

generate a second notification that the heart rate does not correspond to the stored heart rate; and output the second notification to at least one of the user interface or an external server.

18. The non-transitory computer readable medium of claim 16, wherein the instructions are to cause at least one of the one or more processor circuits to verify that the user is authentic based on the comparison of the heart rate to the stored heart rate.

* * * * *